United States Patent
Rhoads

(10) Patent No.: US 8,094,949 B1
(45) Date of Patent: Jan. 10, 2012

(54) MUSIC METHODS AND SYSTEMS

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 1078 days.

(21) Appl. No.: 09/574,726

(22) Filed: May 18, 2000

Related U.S. Application Data

(63) Continuation-in-part of application No. 09/186,962, filed on Nov. 5, 1998, which is a continuation of application No. 08/649,419, filed on May 16, 1996, now Pat. No. 5,862,260, which is a continuation-in-part of application No. PCT/US96/06618, filed on May 7, 1996, which is a continuation-in-part of application No. 08/637,531, filed on Apr. 25, 1996, now Pat. No. 5,822,436, which is a continuation-in-part of application No. 08/534,005, filed on Sep. 25, 1995, now Pat. No. 5,832,119, which is a continuation-in-part of application No. 08/508,083, filed on Jul. 27, 1995, now Pat. No. 5,841,978, which is a continuation-in-part of application No. 08/436,102, filed on May 8, 1995, now Pat. No. 5,748,783, which is a continuation-in-part of application No. 08/327,426, filed on Oct. 21, 1994, now Pat. No. 5,768,426.

(60) Provisional application No. 60/134,782, filed on May 19, 1999.

(51) Int. Cl.
*G06K 9/36* (2006.01)
*G06Q 20/00* (2006.01)

(52) U.S. Cl. .............. 382/232; 705/50; 705/65; 705/75; 382/284

(58) Field of Classification Search ............... 705/17, 705/77, 55, 59, 76; 380/205, 210, 221, 227, 380/231, 232; 382/232
See application file for complete search history.

(56) References Cited

U.S. PATENT DOCUMENTS

| | | | |
|---|---|---|---|
| 3,810,156 A | 5/1974 | Goldman | |
| 3,845,391 A | 10/1974 | Crosby | |
| 3,919,479 A | 11/1975 | Moon et al. | |
| 3,984,624 A | 10/1976 | Waggener | |
| 4,071,698 A | 1/1978 | Barger, Jr. et al. | |
| 4,179,212 A * | 12/1979 | Lahr | 399/79 |
| 4,230,990 A | 10/1980 | Lert, Jr. et al. | |
| 4,238,849 A | 12/1980 | Gassmann | |
| 4,284,846 A | 8/1981 | Marley | |
| 4,313,197 A | 1/1982 | Maxemchuk | |
| 4,367,488 A | 1/1983 | Leventer et al. | |
| 4,379,947 A | 4/1983 | Warner | |
| 4,380,027 A | 4/1983 | Leventer et al. | |

(Continued)

FOREIGN PATENT DOCUMENTS

EP 161512 11/1985

(Continued)

OTHER PUBLICATIONS

Matsui, "Deep Cryptography of Images," Deep Encryption of Images—Techniques and Applications, Jun. 15, 1993, 10 pages.

(Continued)

*Primary Examiner* — Charles C Agwumezie

(57) ABSTRACT

The disclosure details a variety of applications of steganographic encoding and decoding of auxiliary information in physical and media objects. In particular, digital watermarks embedded in media content are used to initiate automated transactions associated with the content and to link creative content with information or transactions.

4 Claims, 1 Drawing Sheet

U.S. PATENT DOCUMENTS

| | | | |
|---|---|---|---|
| 4,395,600 A | 7/1983 | Lundy et al. | |
| 4,425,642 A | 1/1984 | Moses et al. | |
| 4,432,096 A | 2/1984 | Bunge | |
| 4,450,531 A | 5/1984 | Kenyon et al. | |
| 4,495,526 A | 1/1985 | Baranoff-Rossine | |
| 4,499,601 A | 2/1985 | Matthews | |
| 4,511,917 A | 4/1985 | Kohler et al. | |
| 4,528,588 A | 7/1985 | Löfberg | |
| 4,547,804 A | 10/1985 | Greenberg | |
| 4,634,966 A | 1/1987 | Nakatani et al. | |
| 4,639,779 A | 1/1987 | Greenberg | |
| 4,672,605 A | 6/1987 | Hustig et al. | |
| 4,675,746 A | 6/1987 | Tetrick et al. | |
| 4,677,466 A | 6/1987 | Lert, Jr. et al. | |
| 4,682,370 A | 7/1987 | Matthews | |
| 4,697,209 A | 9/1987 | Kiewit et al. | |
| 4,739,398 A | 4/1988 | Thomas et al. | |
| 4,750,173 A | 6/1988 | Blüthgen | |
| 4,776,017 A | 10/1988 | Fujimoto | |
| 4,805,020 A | 2/1989 | Greenberg | |
| 4,807,031 A | 2/1989 | Broughton et al. | |
| 4,843,562 A | 6/1989 | Kenyon et al. | |
| 4,855,827 A | 8/1989 | Best | |
| 4,888,798 A | 12/1989 | Earnest | |
| 4,908,836 A | 3/1990 | Rushforth et al. | |
| 4,918,730 A | 4/1990 | Schulze | |
| 4,931,871 A | 6/1990 | Kramer | |
| 4,945,412 A | 7/1990 | Kramer | |
| 4,947,028 A | 8/1990 | Gorog | |
| 4,967,273 A | 10/1990 | Greenberg | |
| 4,969,041 A | 11/1990 | O'Grady et al. | |
| 4,977,594 A | 12/1990 | Shear | |
| 5,019,899 A | 5/1991 | Boles et al. | |
| 5,023,907 A | 6/1991 | Johnson | |
| 5,023,929 A | 6/1991 | Call | |
| 5,053,956 A | 10/1991 | Donald et al. | |
| 5,103,459 A | 4/1992 | Gilhousen et al. | |
| 5,113,518 A | 5/1992 | Durst | |
| 5,134,719 A | 7/1992 | Mankovitz | |
| 5,138,712 A | 8/1992 | Corbin | |
| 5,146,457 A | 9/1992 | Veldhuis et al. | |
| 5,187,750 A | 2/1993 | Behera | |
| 5,200,822 A | 4/1993 | Bronfin et al. | |
| 5,210,820 A | 5/1993 | Kenyon | |
| 5,214,792 A | 5/1993 | Alwadish | |
| 5,243,423 A | 9/1993 | DeJean et al. | |
| 5,249,166 A * | 9/1993 | Hamilton et al. | 369/30.25 |
| 5,251,301 A | 10/1993 | Cook | |
| 5,262,860 A | 11/1993 | Fitzpatrick | |
| 5,276,629 A | 1/1994 | Reynolds | |
| 5,288,976 A | 2/1994 | Citron | |
| 5,303,393 A | 4/1994 | Noreen et al. | |
| 5,304,786 A | 4/1994 | Pavlidis et al. | |
| 5,315,098 A | 5/1994 | Tow | |
| 5,319,453 A | 6/1994 | Copriviza et al. | |
| 5,319,735 A | 6/1994 | Preuss et al. | |
| 5,371,551 A | 12/1994 | Logan et al. | |
| 5,385,371 A | 1/1995 | Izawa | |
| 5,400,261 A | 3/1995 | Reynolds | |
| 5,410,598 A | 4/1995 | Shear | |
| 5,428,731 A | 6/1995 | Powers | |
| 5,436,653 A | 7/1995 | Ellis et al. | |
| 5,437,050 A | 7/1995 | Lamb et al. | |
| 5,444,779 A * | 8/1995 | Daniele | 399/366 |
| 5,463,209 A | 10/1995 | Figh | |
| 5,473,631 A * | 12/1995 | Moses | 375/130 |
| 5,486,686 A | 1/1996 | Zdybel, Jr. et al. | |
| 5,491,838 A | 2/1996 | Takahisa et al. | |
| 5,493,677 A | 2/1996 | Balogh | |
| 5,495,411 A | 2/1996 | Ananda | |
| 5,495,581 A | 2/1996 | Tsai | |
| 5,496,071 A | 3/1996 | Walsh | |
| 5,502,576 A | 3/1996 | Ramsay et al. | |
| 5,504,518 A | 4/1996 | Ellis et al. | |
| 5,526,427 A | 6/1996 | Thomas et al. | |
| 5,530,852 A | 6/1996 | Meske | |
| 5,539,635 A | 7/1996 | Larson, Jr. | |
| 5,548,645 A | 8/1996 | Ananda | |
| 5,553,143 A | 9/1996 | Ross | |
| 5,564,073 A | 10/1996 | Takahisa | |
| 5,572,246 A | 11/1996 | Ellis et al. | |
| 5,572,653 A | 11/1996 | DeTemple et al. | |
| 5,574,519 A | 11/1996 | Manico et al. | |
| 5,574,962 A | 11/1996 | Fardeau et al. | |
| 5,577,249 A | 11/1996 | Califano | |
| 5,577,266 A | 11/1996 | Takahisa et al. | |
| 5,579,124 A | 11/1996 | Aijala et al. | |
| 5,579,479 A | 11/1996 | Plum | |
| 5,579,537 A | 11/1996 | Takahisa | |
| 5,581,658 A | 12/1996 | O'Hagan et al. | |
| 5,581,800 A | 12/1996 | Fardeau et al. | |
| 5,584,070 A | 12/1996 | Harris et al. | |
| 5,612,729 A | 3/1997 | Ellis et al. | |
| 5,613,004 A | 3/1997 | Cooperman | |
| 5,621,454 A | 4/1997 | Ellis et al. | |
| 5,629,980 A | 5/1997 | Stefik et al. | |
| 5,634,012 A | 5/1997 | Stefik | |
| 5,636,276 A | 6/1997 | Brugger | |
| 5,638,443 A | 6/1997 | Stefik | |
| 5,640,193 A | 6/1997 | Wellner | |
| 5,640,467 A | 6/1997 | Yamashita et al. | |
| 5,646,997 A | 7/1997 | Barton | |
| 5,646,999 A | 7/1997 | Saito | |
| 5,652,626 A | 7/1997 | Kawakami et al. | |
| 5,652,714 A | 7/1997 | Peterson | |
| 5,657,462 A | 8/1997 | Brouwer | |
| 5,659,164 A | 8/1997 | Schmid | |
| 5,661,787 A | 8/1997 | Pocock | |
| 5,663,766 A | 9/1997 | Sizer, II | |
| 5,665,951 A | 9/1997 | Newman et al. | |
| 5,668,636 A | 9/1997 | Beach et al. | |
| 5,671,267 A | 9/1997 | August et al. | |
| 5,671,282 A | 9/1997 | Wolff et al. | |
| 5,673,316 A | 9/1997 | Auerbach et al. | |
| 5,680,223 A | 10/1997 | Cooper et al. | |
| 5,687,236 A | 11/1997 | Moskowitz et al. | |
| 5,692,073 A | 11/1997 | Cass | |
| 5,708,478 A | 1/1998 | Tognazzini | |
| 5,715,403 A | 2/1998 | Stefik | |
| 5,717,940 A | 2/1998 | Peairs et al. | |
| 5,721,788 A | 2/1998 | Powell | |
| 5,721,827 A | 2/1998 | Logan et al. | |
| 5,732,216 A | 3/1998 | Logan et al. | |
| 5,734,119 A | 3/1998 | France | |
| 5,742,845 A | 4/1998 | Wagner | |
| 5,761,606 A | 6/1998 | Wolzien | |
| 5,761,686 A | 6/1998 | Bloomberg | |
| 5,765,152 A | 6/1998 | Erickson | |
| 5,765,176 A | 6/1998 | Bloomberg | |
| 5,768,426 A * | 6/1998 | Rhoads | 382/232 |
| 5,774,452 A | 6/1998 | Wolosewicz | |
| 5,774,664 A | 6/1998 | Hidary et al. | |
| 5,774,666 A | 6/1998 | Portuesi | |
| 5,778,102 A | 7/1998 | Sandford, II et al. | |
| 5,778,192 A | 7/1998 | Schuster et al. | |
| 5,781,914 A | 7/1998 | Stork et al. | |
| 5,801,687 A | 9/1998 | Peterson | |
| 5,804,803 A | 9/1998 | Cragun et al. | |
| 5,806,005 A | 9/1998 | Hull et al. | |
| 5,806,031 A | 9/1998 | Fineberg | |
| 5,809,317 A | 9/1998 | Kogan | |
| 5,815,709 A | 9/1998 | Waldo et al. | |
| 5,818,441 A | 10/1998 | Throckmorton | |
| 5,822,432 A | 10/1998 | Moskowitz et al. | |
| 5,822,436 A | 10/1998 | Rhoads | |
| 5,828,325 A | 10/1998 | Wolosewicz et al. | |
| 5,832,119 A | 11/1998 | Rhoads | |
| 5,838,458 A | 11/1998 | Tsai | |
| 5,841,978 A | 11/1998 | Rhoads | |
| 5,842,162 A | 11/1998 | Fineberg | |
| 5,845,281 A | 12/1998 | Benson et al. | |
| 5,848,413 A | 12/1998 | Wolff | |
| 5,848,424 A | 12/1998 | Scheinkman | |
| 5,852,673 A | 12/1998 | Young | |
| 5,857,038 A | 1/1999 | Owada et al. | |
| 5,862,260 A * | 1/1999 | Rhoads | 382/232 |
| 5,866,888 A | 2/1999 | Bravman et al. | |

| | | | |
|---|---|---|---|
| 5,869,819 A * | 2/1999 | Knowles et al. ............... 235/375 |
| 5,872,589 A | 2/1999 | Morales |
| 5,875,249 A | 2/1999 | Mintzer et al. |
| 5,880,453 A | 3/1999 | Wang et al. |
| 5,889,868 A | 3/1999 | Moskowitz et al. |
| 5,892,900 A | 4/1999 | Ginter et al. |
| 5,893,095 A | 4/1999 | Jain et al. |
| 5,893,908 A | 4/1999 | Cullen et al. |
| 5,893,910 A | 4/1999 | Martineau |
| 5,900,608 A | 5/1999 | Iida |
| 5,901,224 A | 5/1999 | Hecht |
| 5,902,353 A | 5/1999 | Reber et al. |
| 5,903,892 A | 5/1999 | Hoffert et al. |
| 5,905,248 A | 5/1999 | Russell et al. |
| 5,905,800 A | 5/1999 | Moskowitz et al. |
| 5,915,019 A | 6/1999 | Ginter et al. |
| 5,915,027 A | 6/1999 | Cox et al. |
| 5,918,223 A | 6/1999 | Blum et al. |
| 5,920,861 A | 7/1999 | Hall |
| 5,920,878 A | 7/1999 | DeMont |
| 5,926,822 A | 7/1999 | Garman |
| 5,930,369 A | 7/1999 | Cox et al. |
| 5,930,767 A | 7/1999 | Reber et al. |
| 5,932,862 A | 8/1999 | Hussey et al. |
| 5,932,863 A | 8/1999 | Rathus et al. |
| 5,933,829 A | 8/1999 | Durst et al. |
| 5,937,000 A | 8/1999 | Lee et al. |
| 5,938,726 A | 8/1999 | Reber et al. |
| 5,938,727 A | 8/1999 | Ikeda |
| 5,940,135 A | 8/1999 | Petrovic |
| 5,940,595 A | 8/1999 | Reber et al. |
| 5,942,741 A | 8/1999 | Longacre, Jr. et al. |
| 5,943,422 A | 8/1999 | Van Wie et al. |
| 5,945,932 A * | 8/1999 | Smith et al. .................... 341/51 |
| 5,963,957 A | 10/1999 | Hoffberg |
| 5,971,277 A | 10/1999 | Cragun et al. |
| 5,974,141 A | 10/1999 | Saito |
| 5,974,548 A | 10/1999 | Adams |
| 5,978,477 A | 11/1999 | Hull et al. |
| 5,978,773 A | 11/1999 | Hudetz |
| 5,982,956 A | 11/1999 | Lahmi |
| 5,983,176 A | 11/1999 | Hoffert et al. |
| 5,983,218 A | 11/1999 | Syeda-Mahmood |
| 5,986,651 A | 11/1999 | Reber et al. |
| 5,986,692 A | 11/1999 | Logan et al. |
| 5,987,509 A | 11/1999 | Portuesi |
| 5,991,737 A | 11/1999 | Chen |
| 5,991,876 A | 11/1999 | Johnson et al. |
| 5,995,105 A | 11/1999 | Reber et al. |
| 5,995,978 A | 11/1999 | Cullen et al. |
| 5,999,224 A | 12/1999 | Maeda et al. |
| 6,002,443 A | 12/1999 | Iggulden |
| 6,005,501 A | 12/1999 | Wolosewicz |
| 6,006,226 A | 12/1999 | Cullen et al. |
| 6,021,432 A | 2/2000 | Sizer, II et al. |
| 6,028,960 A | 2/2000 | Graf et al. |
| 6,035,035 A | 3/2000 | Firooz |
| 6,037,984 A | 3/2000 | Isnardi et al. |
| 6,052,486 A | 4/2000 | Knowlton et al. |
| 6,058,430 A | 5/2000 | Kaplan |
| 6,061,719 A | 5/2000 | Bendinelli et al. |
| 6,064,737 A | 5/2000 | Rhoads |
| 6,075,568 A | 6/2000 | Matsuura |
| 6,081,629 A | 6/2000 | Browning |
| 6,081,827 A | 6/2000 | Reber et al. |
| 6,081,830 A | 6/2000 | Schindler |
| 6,084,528 A | 7/2000 | Beach et al. |
| 6,085,205 A | 7/2000 | Peairs et al. |
| 6,088,455 A | 7/2000 | Logan et al. |
| 6,098,106 A | 8/2000 | Philyaw |
| 6,108,656 A | 8/2000 | Durst et al. |
| 6,121,530 A | 9/2000 | Sonoda |
| 6,122,392 A | 9/2000 | Rhoads |
| 6,122,403 A | 9/2000 | Rhoads |
| 6,122,526 A | 9/2000 | Parulski et al. |
| 6,125,172 A | 9/2000 | August |
| 6,128,012 A | 10/2000 | Seidensticker, Jr. et al. |
| 6,138,151 A | 10/2000 | Reber et al. |
| 6,141,753 A | 10/2000 | Zhao et al. |
| 6,147,940 A | 11/2000 | Yankowski |
| 6,151,208 A | 11/2000 | Bartlett |
| 6,157,721 A | 12/2000 | Shear et al. |
| 6,161,131 A | 12/2000 | Garfinkle |
| 6,164,534 A | 12/2000 | Rathus et al. |
| 6,169,541 B1 | 1/2001 | Smith |
| 6,181,817 B1 | 1/2001 | Zabih et al. |
| 6,182,018 B1 | 1/2001 | Tran et al. |
| 6,182,090 B1 | 1/2001 | Peairs |
| 6,185,683 B1 | 2/2001 | Ginter et al. |
| 6,199,048 B1 | 3/2001 | Hudetz et al. |
| 6,199,073 B1 | 3/2001 | Peairs et al. |
| 6,199,076 B1 | 3/2001 | Logan et al. |
| 6,201,879 B1 | 3/2001 | Bender et al. |
| 6,219,787 B1 | 4/2001 | Brewer |
| 6,240,185 B1 * | 5/2001 | Van Wie et al. ............... 380/232 |
| 6,243,480 B1 | 6/2001 | Zhao et al. |
| 6,256,638 B1 | 7/2001 | Dougherty et al. |
| 6,278,781 B1 | 8/2001 | Rhoads |
| 6,278,884 B1 | 8/2001 | Kim |
| 6,282,362 B1 | 8/2001 | Murphy et al. |
| 6,286,036 B1 | 9/2001 | Rhoads |
| 6,300,880 B1 | 10/2001 | Sitnik |
| 6,304,523 B1 | 10/2001 | Jones |
| 6,311,214 B1 | 10/2001 | Rhoads |
| 6,314,457 B1 | 11/2001 | Schena et al. |
| 6,317,639 B1 | 11/2001 | Hansen |
| 6,321,992 B1 | 11/2001 | Knowles et al. |
| 6,324,573 B1 | 11/2001 | Rhoads |
| 6,334,721 B1 | 1/2002 | Horigane |
| 6,338,094 B1 | 1/2002 | Scott |
| 6,345,104 B1 | 2/2002 | Rhoads |
| 6,345,256 B1 | 2/2002 | Milsted et al. |
| 6,351,815 B1 | 2/2002 | Adams |
| 6,386,453 B1 | 5/2002 | Russell et al. |
| 6,389,055 B1 | 5/2002 | August |
| 6,389,151 B1 | 5/2002 | Carr et al. |
| 6,408,331 B1 | 6/2002 | Rhoads |
| 6,411,725 B1 | 6/2002 | Rhoads |
| 6,434,561 B1 | 8/2002 | Durst, Jr. et al. |
| 6,439,465 B1 | 8/2002 | Bloomberg |
| 6,442,285 B2 | 8/2002 | Rhoads et al. |
| 6,449,367 B2 | 9/2002 | Van Wie et al. |
| 6,449,377 B1 | 9/2002 | Rhoads |
| 6,456,725 B1 | 9/2002 | Cox et al. |
| 6,493,457 B1 * | 12/2002 | Quackenbush et al. ....... 382/100 |
| 6,496,802 B1 | 12/2002 | van Zoest et al. |
| 6,505,160 B1 | 1/2003 | Levy et al. |
| 6,510,234 B1 | 1/2003 | Cox et al. |
| 6,522,769 B1 | 2/2003 | Rhoads et al. |
| 6,522,770 B1 | 2/2003 | Seder et al. |
| 6,526,449 B1 | 2/2003 | Philyaw et al. |
| 6,542,927 B2 | 4/2003 | Rhoads |
| 6,542,933 B1 | 4/2003 | Durst, Jr. et al. |
| 6,549,638 B2 | 4/2003 | Davis et al. |
| 6,553,129 B1 | 4/2003 | Rhoads |
| 6,577,746 B1 | 6/2003 | Evans et al. |
| 6,608,919 B1 | 8/2003 | Alattar |
| 6,614,914 B1 | 9/2003 | Rhoads |
| 6,640,306 B1 | 10/2003 | Tone et al. |
| 6,650,761 B1 | 11/2003 | Rodriguez et al. |
| 6,658,568 B1 | 12/2003 | Ginter et al. |
| 6,674,876 B1 | 1/2004 | Hannigan et al. |
| 6,674,993 B1 | 1/2004 | Tarbouriech |
| 6,675,146 B2 * | 1/2004 | Rhoads ........................ 704/270 |
| 6,681,028 B2 | 1/2004 | Rhoads et al. |
| 6,724,914 B2 | 4/2004 | Brundage et al. |
| 6,748,360 B2 | 6/2004 | Pitman et al. |
| 6,768,980 B1 | 7/2004 | Meyer et al. |
| 6,775,392 B1 | 8/2004 | Rhoads |
| 6,804,376 B2 | 10/2004 | Rhoads et al. |
| 6,807,534 B1 | 10/2004 | Erickson |
| 6,829,368 B2 | 12/2004 | Meyer et al. |
| 6,834,308 B1 | 12/2004 | Ikezoye |
| 6,850,626 B2 | 2/2005 | Rhoads et al. |
| 6,917,691 B2 | 7/2005 | Evans et al. |
| 6,931,451 B1 | 8/2005 | Logan et al. |
| 6,941,275 B1 | 9/2005 | Swierczek |
| 6,947,571 B1 | 9/2005 | Rhoads et al. |

| | | |
|---|---|---|
| 6,965,682 B1 | 11/2005 | Davis et al. |
| 6,970,886 B1 | 11/2005 | Conwell et al. |
| 6,973,669 B2 | 12/2005 | Daniels |
| 7,035,427 B2 | 4/2006 | Rhoads |
| 7,044,395 B1 | 5/2006 | Davis et al. |
| 7,058,697 B2 | 6/2006 | Rhoads |
| 7,171,018 B2 | 1/2007 | Rhoads et al. |
| 7,185,201 B2 | 2/2007 | Rhoads et al. |
| 7,248,717 B2 | 7/2007 | Rhoads |
| 7,302,574 B2 | 11/2007 | Conwell et al. |
| 7,333,957 B2 | 2/2008 | Levy et al. |
| 7,349,552 B2 | 3/2008 | Levy et al. |
| 7,415,129 B2 | 8/2008 | Rhoads |
| 7,437,430 B2 | 10/2008 | Rhoads |
| 7,461,136 B2 | 12/2008 | Rhoads |
| 7,486,799 B2 | 2/2009 | Rhoads |
| 7,499,566 B2 | 3/2009 | Rhoads |
| 7,505,605 B2 | 3/2009 | Rhoads et al. |
| 7,545,951 B2 | 6/2009 | Davis et al. |
| 7,562,392 B1 | 7/2009 | Rhoads et al. |
| 7,565,294 B2 | 7/2009 | Rhoads |
| 7,587,602 B2 | 9/2009 | Rhoads |
| 7,590,259 B2 | 9/2009 | Levy et al. |
| 7,593,576 B2 | 9/2009 | Meyer et al. |
| 7,606,390 B2 | 10/2009 | Rhoads |
| 7,650,009 B2 | 1/2010 | Rhoads |
| 7,650,010 B2 | 1/2010 | Levy et al. |
| 7,697,719 B2 | 4/2010 | Rhoads |
| 7,711,564 B2 | 5/2010 | Levy et al. |
| 7,760,902 B2 | 7/2010 | Rhoads |
| 7,805,500 B2 | 9/2010 | Rhoads |
| 7,930,546 B2 | 4/2011 | Rhoads et al. |
| 7,936,900 B2 | 5/2011 | Rhoads |
| 7,965,864 B2 | 6/2011 | Davis et al. |
| 7,966,494 B2 | 6/2011 | Rhoads |
| 7,987,245 B2 | 7/2011 | Rhoads |
| 2001/0001854 A1 | 5/2001 | Schena et al. |
| 2001/0011233 A1 | 8/2001 | Narayanaswami |
| 2001/0016852 A1 | 8/2001 | Peairs et al. |
| 2001/0023193 A1 | 9/2001 | Rhoads |
| 2001/0026618 A1 | 10/2001 | Van Wie et al. |
| 2001/0026629 A1 | 10/2001 | Oki |
| 2001/0031066 A1 | 10/2001 | Meyer et al. |
| 2001/0032251 A1 | 10/2001 | Rhoads et al. |
| 2001/0032312 A1 | 10/2001 | Runje et al. |
| 2001/0037313 A1 | 11/2001 | Lofgren et al. |
| 2001/0039546 A1 | 11/2001 | Moore et al. |
| 2001/0043362 A1 | 11/2001 | Hull et al. |
| 2001/0044824 A1 | 11/2001 | Hunter et al. |
| 2001/0051915 A1 | 12/2001 | Ueno et al. |
| 2001/0051996 A1 | 12/2001 | Cooper et al. |
| 2001/0055391 A1 | 12/2001 | Jacobs |
| 2002/0010826 A1 | 1/2002 | Takahashi et al. |
| 2002/0021805 A1 | 2/2002 | Schumann et al. |
| 2002/0021822 A1 | 2/2002 | Maeno |
| 2002/0023020 A1 | 2/2002 | Kenyon et al. |
| 2002/0023148 A1 | 2/2002 | Ritz et al. |
| 2002/0023218 A1 | 2/2002 | Lawandy et al. |
| 2002/0028000 A1 | 3/2002 | Conwell et al. |
| 2002/0031240 A1 | 3/2002 | Levy et al. |
| 2002/0032698 A1 | 3/2002 | Cox |
| 2002/0032864 A1 | 3/2002 | Rhoads et al. |
| 2002/0037091 A1 | 3/2002 | Terasaki |
| 2002/0040433 A1 | 4/2002 | Kondo |
| 2002/0048369 A1 | 4/2002 | Ginter et al. |
| 2002/0052885 A1 | 5/2002 | Levy |
| 2002/0072982 A1 | 6/2002 | Barton et al. |
| 2002/0072989 A1 | 6/2002 | Van de Sluis |
| 2002/0075298 A1 | 6/2002 | Schena et al. |
| 2002/0083123 A1 | 6/2002 | Freedman et al. |
| 2002/0102966 A1 | 8/2002 | Lev et al. |
| 2002/0126872 A1 | 9/2002 | Levy et al. |
| 2002/0133499 A1 | 9/2002 | Ward et al. |
| 2002/0150165 A1 | 10/2002 | Huizer |
| 2002/0152388 A1 | 10/2002 | Linnartz et al. |
| 2002/0161741 A1 | 10/2002 | Wang et al. |
| 2002/0178410 A1 | 11/2002 | Haitsma et al. |
| 2003/0011684 A1 | 1/2003 | Narayanaswami et al. |
| 2003/0167173 A1 | 9/2003 | Levy |
| 2003/0174861 A1 | 9/2003 | Levy et al. |
| 2003/0197054 A1 | 10/2003 | Eunson |
| 2004/0022444 A1* | 2/2004 | Rhoads .................. 382/232 |
| 2004/0128514 A1 | 7/2004 | Rhoads |
| 2004/0145661 A1 | 7/2004 | Murakami et al. |
| 2004/0169892 A1 | 9/2004 | Yoda |
| 2004/0201676 A1 | 10/2004 | Needham |
| 2004/0205055 A1* | 10/2004 | Overton et al. ................ 707/3 |
| 2004/0223626 A1 | 11/2004 | Honsinger et al. |
| 2005/0043018 A1 | 2/2005 | Kawamoto |
| 2005/0058319 A1 | 3/2005 | Rhoads |
| 2005/0065780 A1* | 3/2005 | Wiser et al. .................. 704/201 |
| 2005/0091268 A1 | 4/2005 | Meyer |
| 2005/0229107 A1 | 10/2005 | Hull |
| 2007/0100757 A1 | 5/2007 | Rhoads |
| 2007/0185840 A1 | 8/2007 | Rhoads |
| 2007/0195987 A1 | 8/2007 | Rhoads |
| 2007/0250194 A1 | 10/2007 | Rhoads et al. |
| 2007/0250716 A1 | 10/2007 | Rhoads et al. |
| 2008/0133416 A1 | 6/2008 | Rhoads |
| 2008/0133556 A1 | 6/2008 | Conwell et al. |
| 2008/0140573 A1 | 6/2008 | Levy et al. |
| 2008/0319859 A1 | 12/2008 | Rhoads |
| 2009/0177742 A1 | 7/2009 | Rhoads et al. |
| 2010/0008586 A1 | 1/2010 | Meyer et al. |
| 2010/0009722 A1 | 1/2010 | Levy et al. |
| 2010/0036881 A1 | 2/2010 | Rhoads et al. |
| 2010/0046744 A1 | 2/2010 | Rhoads et al. |
| 2010/0138012 A1 | 6/2010 | Rhoads |
| 2010/0185306 A1 | 7/2010 | Rhoads |
| 2010/0322035 A1 | 12/2010 | Rhoads et al. |

FOREIGN PATENT DOCUMENTS

| | | |
|---|---|---|
| EP | 493091 | 7/1992 |
| JP | HEI 5-37795 | 2/1993 |
| JP | 8-50598 | 2/1996 |
| WO | WO94/00842 | 1/1994 |
| WO | WO95/20291 | 7/1995 |
| WO | WO96/27259 | 9/1996 |
| WO | WO97/41683 | 11/1997 |
| WO | WO9743736 | 11/1997 |
| WO | WO98/03923 | 1/1998 |
| WO | WO98/20411 | 5/1998 |
| WO | WO98/20675 | 5/1998 |
| WO | WO98/24050 | 6/1998 |
| WO | WO99/35809 | 7/1999 |
| WO | WO0036605 | 6/2000 |
| WO | WO00/58940 | 10/2000 |
| WO | WO00/70585 | 11/2000 |
| WO | WO00/79709 | 12/2000 |
| WO | WO0079709 | 12/2000 |
| WO | WO01/01331 | 1/2001 |
| WO | WO0106703 | 1/2001 |
| WO | WO01/20483 | 3/2001 |
| WO | WO01/20609 | 3/2001 |
| WO | WO0115021 | 3/2001 |
| WO | WO01/35676 | 5/2001 |
| WO | WO01/71517 | 9/2001 |
| WO | WO01/75629 | 10/2001 |
| WO | WO0211123 | 2/2002 |
| WO | WO02/27600 | 4/2002 |
| WO | WO0227600 | 4/2002 |

OTHER PUBLICATIONS

Matsutani et al., "A Construction of Copyright-Protected Image Data," Technical Research Reports, the Institute of Electronics, Information and Communication, Engineers, ISEC 94-52-59, Mar. 17, 1995, 20 pages.

Cognicity, Inc. Initial Offer in Response to Secure Digital Music Initiative CfP for Phase II Screening Technology submission 2, Apr. 24, 2000.

Cognicity's Response to Secure Digital Music Initiative CfP for Phase II Screening Technology, Submission 2, Jun. 18, 2000.

Cognicity's Phase II Screening Technology: Non Watermarking Solution, Powerpoint presentation, Jun. 26, 2000.

U.S. Appl. No. 09/343,104, filed Jun. 29, 1999, Rodriguez et al.

U.S. Appl. No. 09/420,945, filed Oct. 19, 1999, Kenyon.

U.S. Appl. No. 09/476,686, filed Dec. 30, 1999, Rhoads et al.
U.S. Appl. No. 09/531,076, filed Mar. 18, 2000, Rhoads et al.
U.S. Appl. No. 09/547,664, filed Apr. 12, 2000, Rhoads et al.
U.S. Appl. No. 09/562,517, filed May 1, 2000, Davis et al.
U.S. Appl. No. 09/574,726, filed May 18, 2000, Rhoads et al.
U.S. Appl. No. 60/000,442, filed Jun. 20, 1995, Hudetz.
U.S. Appl. No. 60/134,782, filed May 19, 1999, Rhoads.
U.S. Appl. No. 60/155,064, filed Sep. 21, 1999, Kenyon.
U.S. Appl. No. 60/175,159, filed Jan. 7, 2000, Derose et al.
U.S. Appl. No. 60/178,028, filed Jan. 26, 2000, Meyer et al.
U.S. Appl. No. 60/191,778, filed Mar. 24, 2000, Ramos.
U.S. Appl. No. 60/232,618, filed Sep. 14, 2000, Cox.
U.S. Appl. No. 60/257,822, filed Dec. 21, 2000, Aggson et al.
U.S. Appl. No. 60/218,824, filed Jul. 18, 2000, Kenyon.
U.S. Appl. No. 60/263,490, filed Jan. 22, 2001, Brunk et al.
Arai et al, "Retrieving Electronic Documents with Real-World Objects on InteractiveDESK," UIST '95, Nov. 14, 1995.
Arai, InteractiveDESK: A Computer-Augmented Desk Which Responds to Operations on Real Objects, CHI 95, May 7, 1995.
Aust, D., "Augmenting Paper Documents with Digital Information in a Mobile Environment," MS Thesis, University of Dortmund, Department of Computer Graphics, Sep. 3, 1996.
Bloomberg, "Embedding Digital Data on Paper in Iconic Text" SPIE vol. 3027, Document Recognition IV, pp. 67-80 (1997).
Bruckstein, A.M.; Richardson, T.J., A holographic transform domain image watermarking method, Circuits, Systems, and Signal Processing vol. 17, No. 3 p. 361-89, 1998. This paper includes an appendix containing an internal memo of Bell Labs, which according to the authors of the paper, was dated Sep. 1994.
"Copyright Protection for Digital Images, Digital Fingerprinting from FBI," Highwater FBI brochure, 1995, 4 pages.
Dautzenberg, "Watermarking Images," Department of Microelectronics and Electrical Engineering, Trinity College Dublin, 47 pages, Oct. 1994.
Depovere, et al., "The VIVA Project: Digital Watermarking for Broadcast Monitoring," 1999 IEEE, pp. 202-205.
Ghias et al, Query by Humming: Musical Information Retrieval in an Audio Database. In ACM Multimedia, pp. 231-236, Nov. 1995.
"High Water FBI Limited Presentation Image Copyright Protection Software," FBI Ltd brochure, Jul. 1995, 17 pages.
Johnson, et al., "Bridging the Paper and Electronic Worlds: The Paper User Interface", Interchi '93, pp. 507-512, Apr. 1993.
Kageyama et al, Melody Retrieval with Humming, Proceedings of Int. Computer Music Conference (ICMC), 1993.
Kim, W.G et al., "A watermarking Scheme for Both Spatial and Frequency Domain to Extract to Seal Image Without the Original Image," Proc. 5.sup.th Int. Symp. On Signal Processing and its Applications, Aug. 1999, pp. 293-296.
Kurak et al., "A Cautionary Note on Image Downgrading," 1992 IEEE, pp. 153-159.
Lin, et al., "Generating Robust Digital Signature for Image/Video Authentication," Proc. Multimedia and Security workshop at ACM Multimedia'98, Sep. 1, 1998, pp. 49-54.
Lu et al., "Highly Robust Image Watermarking Using Complementary Modulations," Proc. 2.sup.nd Information Security Workshop, LNCS vol. 1729, Nov. 1999, pp. 136-153.

Mintzer et al., "Safeguarding Digital library Contents and Users" Digital Watermarking, D-Lib Magazine, Dec. 1997: ISSN 1082-9873.
Mintzer et al., "If One Watermark is Good, Are More Better?," Proc. IEEE Int. Conf. on Acoustics, Speech and Signal Processing, Mar. 1999. pp. 2067-2069.
Muscle Fish press release, Muscle Fish's Audio Search Technology to be Encapsulated into Informix Datablade Module, Jul. 10, 1996.
Newman, William, et al. "A Desk Supporting Computer-Based Interaction with paper Documents," ACM Conference on Human Factors in Computing Systems (CHI '92) May 3-7, 1992, pp. 587-592.
Ohbuchi et al., "A Shape-Preserving Data Embedding Algorithm for NURBS Curves and Surfaces," Proc. Computer Graphics International (CGI '99), Jun. 1999, pp. 180-187.
Onishi et al., "A Method of Watermaking with Multiresolution Analysis and Pseudo Noise Sequences," Systems and Computers in Japan, vol. 29, No. 5, May 1998, pp. 11-19.
Peairs, "Iconic Paper," Proceedings of the Third International Conference on Document Analysis and Recognition (ICDAR '95), pp. 1174-1179, 1995.
Rao, et al. "Protofoil: Storing and Finding the Information Worker's Paper Documents in an Electronic File Cabinet," Human Factors in Computing Systems (CHI '94), pp. 180-186, Boston, MA, Apr. 1994.
Szepanski, "A Signal Theoretic Method for Creating Forgery-Proof Documents for Automatic Verification," Proceedings 1979 Carnahan Conference on Crime Countermeasures, May 16, 1979, pp. 101-109.
Szepanski, "Additive Binary Data Transmission for Video Signals," Papers Presented at Conf. Of Comm. Engineering Soc. Sep. 30-Oct. 3, 1980, Technical Reports vol. 74, pp. 342-352.
Tirkel et al, "Electronic Water Mark," DICTA-93, Macquarie University, Sydney, Australia, Dec. 1993, pp. 666-673.
Voyatzis et al., "The Use of Watermarks in the Protection of Digital Multimedia Products," Proc. of the IEEE, vol. 87, No. 7, Jul. 1999, pp. 1197-1207.
Whittaker, et al., "Back to the Future: Pen and Paper Technology Supports Complex Group Coordination," CHI '95, Conference on Human Factors in Computing Systems, Denver, Colorado (May 7-11, 1995).
Wold et al, Content-Based Classification, Search, and Retrieval of Audio, IEEE Multimedia Magazine, Fall, 1996.
Worring, "Hyperdocument Generation Using OCR and Icon Detection," Proc. 3d Int. Conf. On Doc. Analysis and Recognition, Aug. 14, 1995.
Yi et al., "Agent-Based Copyright Protection Architecture for Online Electronic Publishing," Proc. SPIE vol. 3657: Security and Watermarking of Multimedia Contents, Jan. 1999, pp. 484-493.
Zhao, "A WWW Service to Embed and Prove Digital Copyright Watermarks," Proc. Of the Euro. Conf. on Multimedia Applications, Services and Techniques, May 1996, 15 pages.
Zhao, "WWW Copyright Labeling & Verification", (URL: http://sagittarius.igd.fhg.de:64325), Fraunhofer-IGD, Wilhelminenstr.7, D-64283 Darmstadt, 1 page.
U.S. Appl. No. 09/377,590, filed Jun. 21, 1999, Geoffrey B. Rhoads.
U.S. Appl. No. 09/491,534, filed Jan. 26, 2000, Bruce L. Davis, et al.
U.S. Appl. No. 09/515,826, filed Feb. 29, 2000, Geoffrey B. Rhoads.

* cited by examiner

MUSIC METHODS AND SYSTEMS

RELATED APPLICATION DATA

This application claims priority to copending application 60/134,782, filed May 19, 1999, incorporated herein by reference. This application is a continuation in part of application Ser. No. 09/186,962, filed Nov. 5, 1998, which is a continuation of application Ser. No. 08/649,419, filed May 16, 1996 (now U.S. Pat. No. 5,862,260), which is a continuation-in-part of the following applications: PCT/US96/06618, filed May 7, 1996; application Ser. No. 08/637,531, filed Apr. 25, 1996 (now U.S. Pat. No. 5,822,436); application Ser. No. 08/534,005, filed Sep. 25, 1995 (now U.S. Pat. No. 5,832,119); application Ser. No. 08/508,083, filed Jul. 27, 1995 (now U.S. Pat. No. 5,841,978); application Ser. No. 08/436,102, filed May 8, 1995 (now U.S. Pat. No. 5,748,783); and application Ser. No. 08/327,426, filed Oct. 21, 1994 (now U.S. Pat. No. 5,768,426).

The subject matter of the present application is related to that disclosed in application Ser. Nos. 09/234,780, filed Jan. 20, 1999; 09/314,648, filed May 19, 1999 (now U.S. Pat. No. 6,681,028); 09/337,590, filed Jun. 21, 1999; 09/433,104, filed Nov. 3, 1999 (now U.S. Pat. No. 6,636,615); 09/441,819, filed Nov. 17, 1999; 09/441,821, filed Nov. 17, 1999 now U.S. Pat. No. 6,363,159); 09/442,441, filed Nov. 17, 1999 (now U.S. Pat. No. 6,587,821); 09/464,307, filed Dec. 15, 1999 (now U.S. Pat. No. 6,286,036); 09/473,075, filed Dec. 28, 1999 (now U.S. Pat. No. 6,560,349); 09/476,686, filed Dec. 30, 1999; 09/482,752, filed Jan. 13, 2000 (now U.S. Pat. No. 6,330,335); 09/484,742, filed Jan. 18, 2000; 09/498,223, filed Feb. 3, 2000 (now U.S. Pat. No. 6,574,350); 60/180,364, filed Feb. 4, 2000; 09/520,406, filed Mar. 8, 2000 (now U.S. Pat. No. 6,266,430); 09/563,664, filed May 2, 2000 (now U.S. Pat. No. 6,505,160); and 09/562,517, filed May 1, 2000.

FIELD OF THE INVENTION

The present invention relates to applications of digital watermarking in conjunction with audio, video, imagery, and other media content.

BACKGROUND AND SUMMARY

Watermarking (or "digital watermarking") is a quickly growing field of endeavor, with several different approaches. The present assignee's work is reflected in U.S. Pat. Nos. 5,862,260, 6,614,914 and 6,408,082; and in published specifications WO 9953428 and WO0007356 (corresponding to U.S. Pat. Nos. 6,449,377 and 6,345,104. A great many other approaches are familiar to those skilled in the art. The artisan is presumed to be familiar with the full range of watermarking literature.

In the present disclosure it should be understood that references to watermarking encompass not only the assignee's watermarking technology, but can likewise be practiced with any other watermarking technology. In the context of this document, steganographic processes such as steganographic encoding and decoding of auxiliary data from physical and electronic objects encompasses digital watermarking and other methods for data hiding in media objects.

Watermarking has various uses, but the present specification details several new uses that provide functionality and features not previously available. The invention provides various methods, devices and systems for employing digital watermarking in music and other media objects, such as visual and audiovisual works (e.g., motion pictures, images, video, etc.).

One aspect of the invention is a method for crediting payment for a digital content using information steganographically encoded into the content. The method encodes digital source material to steganographically convey plural-bit auxiliary data. The encoded source material passes to a destination through at least one intervening computer. At the intervening computer, the method detects the encoded source material. It then credits a payment in response to the detection of the encoded source material, in accordance with the plural-bit auxiliary data steganographically conveyed by the encoded source material. The method may also report the detection (e.g., to a location remote from detection via a network or other communication link), and credit royalties based on the detection.

In some implementations, the method decodes the auxiliary data only from source material that has first been tested to indicate the likely presence of such data. One way to test source material is by reference to an encoding attribute that is supplemental to the encoded plural-bit auxiliary data. This encoding attribute may comprise a synchronization signal, a marker signal, a calibration signal, a universal code signal, etc. The attribute may be a characteristic signature such as a repetitive noise burst signal or other form of embedded signal.

Another aspect of the invention is an application of steganographic encoding of audio source material. This method decodes audio source material that is presented to the consumer to extract plural-bit auxiliary data steganographically encoded into the material. It uses the plural-bit auxiliary data to retrieve information about the source material from a remote location or database. The encoded auxiliary data may be used for other applications. For example, data indicating the source material presented to the consumer can be stored and used to generate a report.

Another aspect of the invention is a method for making payments to the proprietor of content based on steganographic data embedded in the content. The method receives an object steganographically encoded with plural-bit auxiliary data, and decodes this auxiliary data from the object. The method consults a registry to determine a proprietor of the object, by reference to said decoded plural-bit auxiliary data, and makes a payment to the proprietor.

Another aspect of the invention is a method of encoding a digital object with a watermark signal. This method encodes the object with a first information signal having relatively small information content, but permitting rapid decoding. The method also encodes the object with a second information signal, having more information content, requiring relatively more time to decode. The first and second information signals comprise at least one watermark embedded in the digital object.

Another aspect of the invention is a method of processing an object that has been steganographically encoded with first and second information signals. The first information signal has relatively small information content, and the second information signal has relatively larger information content. The method decodes from the object the first information signal. The relatively small information content of the first information signal permits relatively rapid decoding. The method controls an operation of an apparatus in accordance with the decoded first information signal. Further, the method decodes from the object the second information signal, which requires relatively more time to decode. The second information signal conveys a master global address. The master global address has many applications as detailed below.

Another aspect of the invention is a method of encoding audio with a marker signal indicating a master global address used to link to a web site, wherein the marker signal is characterized by being in-band and repetitive.

Another aspect of the invention is a method for facilitating commercial transactions through a watermark in a physical object. The method reads payload data from a watermark on physical object using a device. It uses the payload data read by the device in connection with a commercial transaction involving music related to said object.

Another aspect of the invention is a method of altering music data to steganographically insert plural bits of watermark data therein. The method is characterized by inserting a first group of bits for benefit of an end-user of the music data, inserting a second group of bits different than the first for benefit of an artist whose music is encoded by said music data, and inserting a third group of bits different than the first two for benefit of a distributor of the music data.

Another aspect of the invention is a media object clearinghouse system. The system includes a media object clearinghouse operable to transfer a media object electronically. It also includes a watermark decoder in communication with a media object receiver to receive a media object signal and operable to decode a watermark from the media object signal identifying the media object. Additionally, the system includes a transmitter in communication with the decoder for receiving a media object identifier derived from the watermark and for transmitting the media object identifier and a user identifier to the clearinghouse. The media object clearinghouse is operable to identify the media object based on the media object identifier and the user based on the user identifier and electronically transfer a copy of the media object to a predetermined location associated with the user.

Another aspect of the invention is a media object clearinghouse method. The method receives a media object from a broadcast or electronic transfer. It decodes a watermark from the media object. It then derives a media object identifier from the watermark. The method transmits the media object identifier and a user identifier to a clearinghouse. In the clearinghouse, it identifies the media object based on the media object identifier and the user based on the user identifier and electronically transfers a copy of the media object to a predetermined location associated with the user.

Another aspect of the invention is a method for linking an audio object with additional information or actions related to the audio object. The method decodes a watermark from the media object. It then derives a master global address from the watermark. It connects to a remote device and retrieves additional information associated with the audio object based on the master global address. For example, in one application, the method retrieves information from a web server linked to the audio object through the master global address. The web server may return information about the audio object as well as customized menu options. The information may include instructions governing use of the object, a request for payment authorization, etc.

The master global address may be used to query a server, which in turn looks up an address of another remote device to which the query is to be routed. The remote device may return information, such as a web page, instructions governing use of the audio object, etc.

Further features will become apparent with reference to the following detailed description and accompanying drawings.

DETAILED DESCRIPTION

Figure 1:
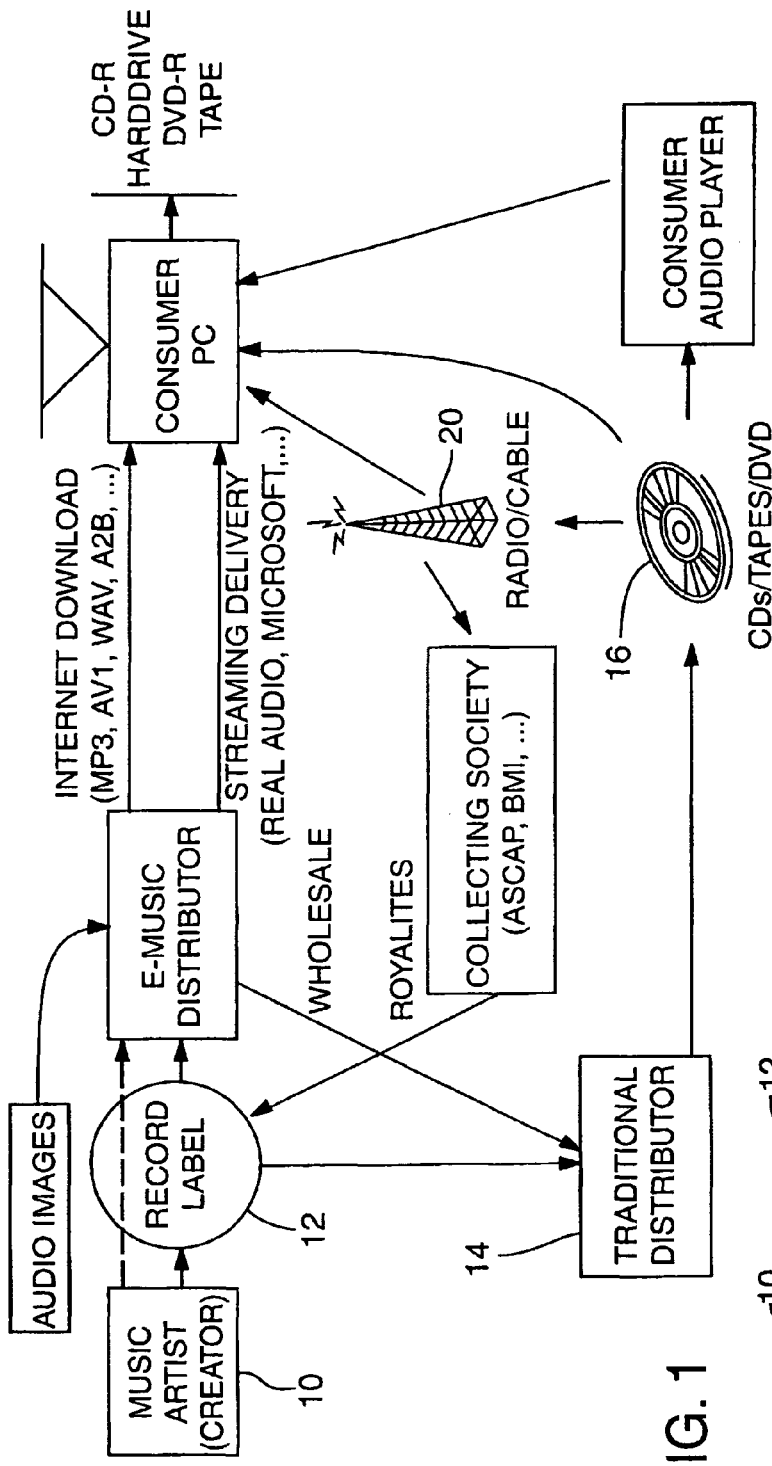
FIG. 1 is a diagram showing the participants, and channels, involved in the distribution of music.
Figure 2:
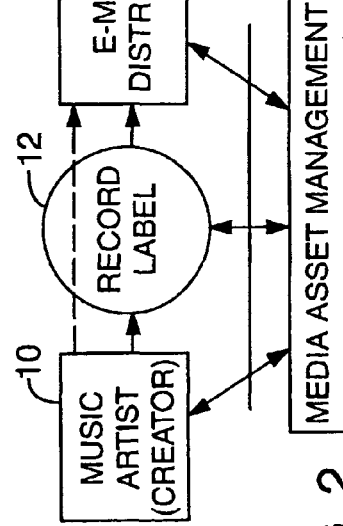
FIG. 2 shows a conceptual model of how music artists, record labels, and E-Music distributors can all interact with a Media Asset Management System, of which several are detailed in the following specification.

For expository convenience, much of the following discussion focuses on music, but the same principles and techniques are largely or wholly applicable to other source data, whether non-music audio, video, still imagery, printed materials, etc.

Music Asset Management

Referring to the figures, the music distribution process begins with a creative artist 10. The artist's music has traditionally been distributed by a record label 12. (While the following discussion refers to distribution through such a label, it should be understood that such distribution can just as well be effected directed under the artist's control, without a record label intermediary.)

In traditional distribution 14, the record label produces tangible media, such as records, tapes, videos (e.g. music videos), and CDs 16. These media are physically distributed to end-consumers 18. Additionally, the label 12 distributes the music media to outlets 20, such as radio and TV stations, cable and satellite systems, etc., which broadcast (or narrowcast) the artist's work to an audience. Distribution through such media outlets may be monitored by playout tracking services. Playout tracking data, collected by firms including Arbitron, Nielsen, ASCAP, BMI, etc., can be used to compute royalty payments, to verify broadcast (e.g. for advertising), etc.

Increasingly, the distribution of the music to the media outlets is performed electronically. Such distribution first took the form of analog audio over high quality landlines or satellite channels. Digital audio quickly supplanted analog audio in such distribution channels due to higher fidelity.

More recently, distribution of the music from the record labels to the media outlets has occurred over secure links, now including the internet. Such security was first provided simply by scrambling the audio signal or data. More sophisticated "container"-based systems are now coming into vogue, in which the audio is "packaged" (often in encrypted form) with ancillary data.

Electronic distribution of music to the consumer is also gaining popularity, presently in the MP3 format primarily. The music providers may deal directly with the public, but more commonly effect such consumer distribution through a newly emerging tier of digital media outlets, such as internet sites that specialize in music. From such sites, consumers can download digital audio files into personal digital audio players. (The Diamond Rio, and the Audible MobilePlayer devices are some of the first of what will doubtless be a large number of entrants into this personal internet audio appliance market.) Or the downloaded data can be stored by the consumer-recipient onto any other writeable media (e.g. hard disk, CD, DVD, tape, videotape, etc.). Typically a personal computer is used for such downloading, but this intermediary may be dispensed with by coupling next generation of personal audio appliances to an internet-like link.

The data downloaded by the consumer can be stored either in the native digital format, translated into another digital format (which translation may include decryption), converted into analog and recorded in analog form, etc.

Unauthorized copying or use of the music can occur anywhere in the foregoing channels. However, one of the greatest risks occurs once the music has been delivered to the consumer (whether by tangible media, by traditional broadcast media outlets, by emerging digital distribution, or otherwise).

The general idea of embedding auxiliary data into music (i.e. watermarking) has been widely proposed, but so far has been of limited applicability.

For example, GoodNoise is planning to embed a digital signature—termed a multimedia identifier, or MMI—in its MP3 music. MMI will register the song and its author with a licensing number. In addition to providing information about the songwriter and distributor, this digital encoding may also include lyrics, liner notes, and other information. But all of the proposed uses serve only to convey information from the distributor to the consumer; use for "tracking" is actively disclaimed. (Wired News, "GoodNoise Tags MP3 Files," Feb. 3, 1999.)

The Genuine Music Coalition—a partnership of various companies in the music distribution business—likewise has announced plans to employ watermarking of MP3 music. The watermarking technology, to be provided by Liquid Audio, will convey data specifying the artist or producer contact, copyright data, and a number to track ownership. The Coalition hopes that the provision of this embedded information will help thwart piracy. Industry observers believe Liquid Audio will next introduce playback technology only plays audio in which its watermark is detected. (Wired News, "Liquefying MP3," Jan. 23, 1999.)

A similar initiative has been announced by the Recording Industry Association of America (RIAA). Termed the Secure Digital Music Initiative (SDMI), the program seeks to define a voluntary specification that will assure proper compensation to those who produce and distribute music. One element of the system will likely be a watermarking component. (Dow Jones Newswire, "Spurred By Maverick Technology, Music Industry Eyes Web," Dec. 31, 1998.)

Yet another initiative has been announced by Solana and ASCAP. Other companies promoting watermarking for music include Aris Technology, MCY.com, and AudioSoft.

The watermark payload can represent various types of data. An exemplary payload includes data relating to the artist, distribution entity, title, and copyright date/proprietor. Additionally, the payload can include a digital object identifier—an ISBN-like number issued by a central organization (e.g. a rights management organization) to uniquely identify the work.

Such payload data can be encoded literally (e.g. the title by a series of ASCII characters, etc.). In other embodiments, codes or abbreviations can be employed—with each code having a known meaning. In still other embodiments, the data can be meaningless by itself, but may serve as a key (e.g., a Unique Identifier, or UID) into a remote data database or repository. An example of such a remote data repository is a web site at a Master Global Address (MGA) associated with content, as detailed below.

An exemplary data payload may, for example, have the following format:

| A | B | C | D | E | F | G | H | I |

Where A is a six-byte (8-bits to a byte) ASCII string serving as a digital object identifier (which may serve as a link to a Master Global Address through a default name server, as discussed below), B is a two-byte ASCII field serving as a key into an "artist" field of the remote database, C is a three-byte ASCII field serving as a key into a "title" field of the remote database; D is a 14-bit field serving as a key into a "label" field of the remote database, E is an 8-bit integer representing the work's year of first publication (with 0 representing the year 2000); F is a 10-bit field serving as a key into a "price" field of the remote database, G is a two-byte usage control string (detailed below), H is a streaming data channel, and I is a string of bits serving as a cyclic redundancy checksum for the foregoing. (More sophisticated error correcting checksums can, of course, be employed.) This payload format totals 136 bits, exclusive of the CRC coding and the streaming data channel.

This payload is encoded repeatedly, or redundantly through the music, so that the full payload can be decoded from partial excerpts of the music.

The encoding is also desirably perceptually adaptive, so that higher energy encoding is employed where the listener is less likely to perceive the additional "noise" introduced by the encoding, and vice versa. Various techniques for perceptually adaptive encoding are known. For example, some tie the amplitude of the encoded signal to the instantaneous amplitude of the music. Others exploit psychoacoustic "masking" of one signal by a spectrally- or temporally-adjoining signal of higher energy. Still other approaches fill gaps in the music's spectrum with watermark energy.

In other embodiments, perceptually adaptive encoding is not used. In some such embodiments, no tailoring of the temporal or spectral characteristics of the watermark signal is employed. In others, the watermark signal is spectrally filtered to emphasize low frequency audio components (e.g. less than 500 hz), high frequency audio components (e.g. higher than 2500 hz), or mid-frequency audio components (500-2500 hz).

The streaming data field channel (H) is a medium by which data can be conveyed from a distribution site (or other site) to the end user. Such data may be entirely unrelated to the underlying work. For example, it may serve a utilitarian purpose, such as conveying data to a memory in the consumer device to replace previously-stored data that is out-of-date. It may be a commercial channel on which bandwidth is sold for access to the consumer or the consumer's device. Essentially any purpose can be served by this streaming data field. Unlike most of the other fields, the streaming data field may not endlessly repeat the same data, but can convey data that changes with time.

Desirably, the encoding is performed in a manner permitting recovery of the watermark data even if the audio is corrupted, e.g. by format conversion, re-sampling, tape wow and flutter, compression, coding, or various forms of audio processing (e.g. filtering, pre-emphasis, re-scaling, etc.). One way to provide for such robustness is to encode a signal of known character that can be recognized through all such corruption. By identifying such known signal, the watermark signal can then be decoded. (The known signal can take various forms, e.g. a synchronization signal, a marker signal, calibration signal, a universal code signal as described in applicant's patents, etc.)

In some embodiments, a watermark "dial-tone" signal is provided. This dial-tone signal is a low amplitude, relatively wideband, repetitive signal that commonly conveys only limited information (e.g. a single bit of information). Its presence in an audio signal can serve as a "do not record," or similar instruction signal. Alternatively, or in addition, the dial-tone signal can serve as an aid in "locking" to a plural-bit digital watermark signal that is also encoded in the audio. For example, the cyclical repetition of the signal can serve to identify the start of the plural-bit digital watermark signal. Or the spectrum or repetition rate of the signal can identify any temporal corruption of the audio. An exemplary such signal is detailed as a "simple universal code" in U.S. Pat. No. 5,636, 292.

A track of music can be pre-authorized for specified types of use. For example, the usage control string of the watermark payload may include a six-bit field detailing the classes of devices for which the audio is authorized. Each bit would correspond to a different class of device. Class 1 devices may be personal playback devices with only analog-audio output. Class 2 devices may be personal entertainment devices capable of outputting music in digital (e.g. MP3, redbook, *.WAV) format, as well as analog audio. Class 3 devices may be personal computer systems (i.e. with essentially unlimited ability for processing and outputting digital audio). Etc., etc. A device to which such MP3 audio is provided would check the usage control string data to determine whether it is authorized to utilize the audio. A personal playback device with analog-only output, for example, would examine the first bit of the usage control string. If it was "1," the device would be authorized to use (i.e. playback) the MP3 data; if it was a "0," the device would refuse to play the music.

In addition to pre-authorization for certain classes of devices, the usage control string can also include bits indicating the number of permitted playbacks. This data can be encoded in bits seven through nine, representing eight possibilities:

0—no playback permitted
1—single playback permitted
2—two playbacks permitted
3—three playbacks permitted
4—four playbacks permitted
5—five playbacks permitted
6—10 playbacks permitted
7—unlimited playbacks permitted
8—refer to associated data (within the watermark, or stored at a remote site) which specifies number of permitted playbacks.

The playback device may include a non-volatile store in which the number of permitted playbacks is stored for each track of music. The device would decrement this number at the beginning of each playback.

The usage control string can also include a two-bit field (bits ten and eleven) indicating recording permissions. A value of 0 means that data corresponding to the MP3 audio (regardless of digital format) should never be made available to another digital device. A value of 1 means that the data corresponding to the MP3 data may be made available once to another digital device. A value of 2 means that the data may be made available an unlimited number of times to other digital devices. (Value 3 is reserved.)

Another data field that can be included in an audio watermark is a rating that indicates age-appropriateness. Music with violence or sexual themes might be given a rating akin to the MPAA "PG-13" or "R" rating. Audio appliances may be programmed to recognize the rating of incoming music, and to interrupt playback if the rating exceeds a certain threshold setting. Various known techniques can be employed to assure that such settings cannot readily be changed, e.g., by juvenile listeners.

Another data field that can be included in an audio watermark is a date field. This field can indicate either the date the music was watermarked, or a date in the future on which certain rights associated with the music should change. Some consumers, for example may not wish to purchase perpetual playback rights to certain musical selections. The right to play a selection for 6 months may suffice for many consumers, especially if the price is discounted in view of the limited term. Such an arrangement would not be wholly disadvantageous to music distributors, since some consumers may end up purchasing music twice if their initial assessment of a musical selection's appeal was too short-sighted. (Naturally, the playback equipment would require a source of real-time clock data against which the date field in the watermark can be checked to ensure that the playback rights have not yet expired.)

Another of the data fields that can be included in an audio watermark specifies technical playback parameters. For example, the parameter can cause the playback appliance to apply a spectral equalization that favors bass frequencies, or treble frequencies, or mid-range frequencies, etc. Other pre-configured equalization arrangements can similarly be invoked responsive to watermark data. Likewise, the parameter can invoke special-effects provided by the playback appliance, e.g., echo effects, reverb, etc. (Again, such parameters are usually represented in an abbreviated, coded form, and are interpreted in accordance with instructions stored in a memory (either in the playback appliance, or linked thereto).

The same data fields and principles can be applied to non-audio content. In video, for example, watermarked data can adaptively control the display monitor or playback parameters (e.g., color space) to enhance the viewing experience.

Music Asset Management/Commerce

The majority of domestic music piracy is not organized. Rather, it is a crime of opportunity and convenience. If the crime were made more difficult, the alternative of obtaining a copy through legitimate channels would be less onerous. Similarly, if the procedure for obtaining a copy through legitimate channels were simplified, the incentive for piracy would be reduced. Watermarking facilitates both—making the crime more difficult, and making legitimate music acquisition easier.

Consider, for example, the pricing of music in conventional record stores. A CD (compact disk) may cost $15, but its sale may be driven by just one or two popular songs on the disk. To obtain these songs, the consumers must purchase the entire disk, with perhaps a dozen songs of no particular interest. This, in essence, is a tying arrangement that benefits the record labels while prejudicing the consumers. Given these circumstances, and a ready opportunity to make copies, it is not surprising that customers sometimes make illicit copies.

One classic technique of avoiding purchase of a complete collection of music, when only one or two songs is desired, is to record the music off the radio. While of dubious legality, this technique was popular in the era of combined cassette/radio players. However, the desired music was sometimes difficult to encounter in a radio broadcast, and the quality was less than superb.

The combined cassette/radio player has now evolved into a general purpose computer with wide-ranging functionality, and other sophisticated devices. Music can be acquired off the web, and can be recorded in various forms (e.g. in a personal MP3 player, stored on a hard disk, stored on a writeable CD-ROM, played back and recorded on analog cassette, etc., etc.). The quality can be quite high, and the erratic broadcast time problems of radio broadcasts have been overcome by the web's on-demand delivery mechanisms. (Moreover, the music can be downloaded in faster-than-realtime, a further benefit over recording-off-the-air techniques.)

One hybrid between the new and old is a novel radio (e.g., for use in a car) that has a "capture" button on the front panel (or other form of user interface, e.g., a Capture icon on a GUI). If a user hears a song they want to record and keep, they press the Capture button while the song is playing. In response, the radio device decodes a watermark embedded in the music, and thereby knows the identity of the music. The radio then makes a wireless transmission identifying the user and the desired song. A local repeater network picks up the wireless signal and relays it (e.g. by wireless rebroadcast, by modem, or other communication medium) to a music clearinghouse. The clearinghouse charges the user a nominal fee (e.g. via a pre-arranged credit card), and queues the music for download to a predetermined location associated with the user.

In one embodiment, the predetermined location is the user's own computer. If a "live" IP address is known for the user's computer, the music can be transferred immediately. If the user's computer is only occasionally connected to the internet, the music can be stored at a web site (e.g. protected with a user-set password), and can be downloaded to the user's computer whenever it is convenient.

In other embodiments, the predetermined location is a personal music library maintained by the user. The library can take the form, e.g., of a hard-disk or semiconductor memory array in which the user customarily stores music. This storage device is adapted to provide music data to one or more playback units employed by the user (e.g. a personal MP3 player, a home stereo system, a car stereo system, etc.). In most installations, the library is physically located at the user's residence, but could be remotely sited, e.g. consolidated with the music libraries of many other users at a central location.

The personal music library can have its own internet connection. Or it can be equipped with wireless capabilities, permitting it to receive digital music from wireless broadcasts (e.g. from the clearinghouse). In either case, the library can provide music to the user's playback devices by short-range wireless broadcast.

By such arrangement, a user can conveniently compile an archive of favorite music—even while away from home.

Many variants of the foregoing are of course possible. The radio can be a portable unit (e.g. a boombox, a Walkman radio, etc.), rather than an automotive unit. The UI feature employed by the user to initiate capture a musical selection need not be a button (physical or on-screen). For example, in some embodiments it can be a voice-recognition system that responds to spoken commands, such as "capture" or "record." Or it can be a form of gesture interface.

Instead of decoding the watermark only in response to the user's "capture" command, the radio can decode watermarks from all received programs, and keep the most recent in a small FIFO memory. By such arrangement, the user need not issue the capture instruction while the song is playing, but can do so even after the song is finished.

In some embodiments, data corresponding to the watermark can be made available to the user in various forms. For example, it can be presented to the user on an LCD screen, identifying the artist and song currently playing. If a corresponding UI button is activated, the device can so-identify the last several selections. Moreover, the data need not be presented to the user in displayed form; it can be annunciated by known computer-speech technologies instead.

In embodiments in which the watermark does not convey ASCII text data, but instead conveys UIDs, or coded abbreviations, the device must generally interpret this data before presenting it to the user. In an illustrative embodiment, the device is a pocket-sized FM radio and is equipped with a 1 megabyte semiconductor non-volatile RAM memory. The memory includes a data structure that serves as a look-up table, matching code numbers to artist names and song titles. When the user queries the device to learn the identify of a song, the memory is indexed in accordance with one or more fields from the decoded watermark, and the resulting textual data from the memory (e.g. song title and artist) is annunciated or displayed to the user.

In most applications, such memory will require frequent updating. The RF receiver provides a ready mechanism for providing such updated data. In one embodiment, the radio "awakens" briefly at otherwise idle moments and tunes to a predetermined frequency at which updated data for the memory is broadcast, either in a baseband broadcast channel, or in an ancillary (e.g. SCA) channel.

In variants of the foregoing, internet delivery of updated memory data can be substituted for wireless delivery. For example, the artist/song title memory in the personal player can be updated by placing the player in a "nest" every evening. The nest (which may be integrated with a battery charger for the appliance) can have an internet connection, and can exchange data with the personal device by infrared, inductive, or other proximity-coupling technologies, or through metal contacts. Each evening, the nest can receive an updated collection of artists/song titles, and can re-write the memory in the personal device accordingly. By such arrangement, the watermark data can always be properly interpreted for presentation to the user.

The "Capture" concepts noted above can be extended to other functions as well. One is akin to forwarding of email. If a consumer hears a song that another friend would enjoy, the listener can send a copy of the song to the friend. This instruction can be issued by pressing a "Send" button, or by invoking a similar function on a graphical (or voice- or gesture-responsive) user interface. In response, the appliance so-instructed can query the person as to the recipient. The person can designate the desired recipient(s) by typing in a name, or a portion thereof sufficient to uniquely identify the recipient. Or more typically, the person can speak the recipient's name. As is conventional with hands-free vehicle cell phones, a voice recognition unit can listen to the spoken instructions and identify the desired recipient. An "address book"-like feature has the requisite information for the recipient (e.g., the web site, IP address, or other data identifying the location to which music for that recipient should stored or queued, the format in which the music should be delivered, etc.) stored therein. In response to such command, the appliance dispatches instructions to the clearinghouse, including an authorization to debit the sender's credit card for the music charge. Again, the clearinghouse attends to delivery of the music in a desired manner to the specified recipient.

Still further, a listener may query the appliance (by voice, GUI or physical button, textual, gesture, or other input) to identify CDs on which the then-playing selection is recorded. Or the listener may query the appliance for the then-playing artist's concert schedule. Again, the appliance can contact a remote database, relay the query, and forward data from the watermark payload identifying the artist and/or song title to which the query relates. The database locates the requested data, and relays same back to the appliance for presentation (via a display, by machine speech, or other output) to the user. If desired, the user can continue the dialog with a further instruction, e.g., to buy one of the CDs on which the then-playing song is included. Again, this instruction may be entered by voice, GUI, etc., and dispatched from the appliance to the clearinghouse, which can then complete the transaction in accordance with pre-stored information (e.g. credit card account number, mailing address, etc.). A confirming message is relayed to the appliance for presentation to the user.

While the foregoing transactions require a link to a remote site or database, other watermark-based consumer services can be provided without such a link. For example, a user can query the appliance as to the artist or song-title of the selection currently playing. The appliance can consult the embedded watermark data (and optionally consult a memory to determine the textual names associated with coded watermark data), and provide the requested information to the user (e.g., by a display, annunciation, or other output).

The foregoing concepts (e.g. Capture, Send, etc.) can also be employed in connection with internet- rather than radio-delivery of music. (The following discussion is illustrated with reference to the "Capture" function, but it will be recognized that the other earlier-discussed features can be similarly implemented.)

There are many commercial web sites that sell audio (in CD form or otherwise), and offer limited free music downloads, (or music clips) as an enticement to lure consumers. But there are also a great number of music web sites that have no commercial pretense. They are hosted by music lovers strictly for the enjoyment of other music lovers. When music is downloaded from such a web site, the end-user's computer can analyze the digital data to decode watermark data therefrom. Again, the user can be presented with a "Capture" button that initiates a commercial transaction, by which a complete copy of the then-downloaded audio is sent to a prearranged storage location, and the user's credit card is debited accordingly. This transaction can occur independently of the site from which the music is downloaded (e.g. through the clearinghouse referenced above).

While the "Capture" button can be presented on the website, this would generally not be in keeping with the non-commercial nature of such web sites. Instead, in an exemplary embodiment, the Capture feature is a software program resident at the user's computer. When this software program is invoked by the user, a socket channel is instantiated between the user's computer and the clearinghouse over the then-existing internet connection. The decoded watermark data and user ID is transmitted to the clearinghouse over this channel, without interrupting the user's other activity (e.g. downloading music from the non-commercial web site). In response, the clearinghouse transmits the music to the prearranged location and attends to billing.

In some embodiments, a watermark detector is included as part of the operating system, and constantly monitors all TCP/IP, or other internet, data received by the user's computer, for the presence of watermarks. In such case, when the Capture feature is invoked, the program examines a memory location in which the operating system stores the most-recently received watermark data. In another embodiment, the computer does not monitor all internet traffic for embedded watermark data, but includes an API that can be called by the Capture program to decode a watermark from the data then being received. The API returns the decoded watermark data to the Capture program, which relays same to the clearinghouse, as above. In still another embodiment, the watermark decoder forms part of the Capture program, which both decodes the watermark and relays it to the clearinghouse when the Capture program is invoked by the user.

There are various techniques by which the Capture program can be selectively invoked. One is by a keyboard macro (e.g. by a combination of keyboard keys). Another is by a program icon that is always presented on the screen, and can be double-clicked to activate. (Again, confirmation processes may be called for, depending on the likelihood of inadvertent invocation.) Many other techniques are likewise possible.

In the just-contemplated scenario, the Capture operation is invoked while the user is downloading music from a non-commercial web site. This seems somewhat redundant, since the downloading—itself—is transferring music to the user's computer. However, the Capture operation provides added value.

In the case of streaming audio, the audio is not typically stored in a location in which it can be re-used by the consumer. It can be listened-to as delivered, but is then gone. Capturing the audio provides the user a copy that can be played repeatedly.

In the case of downloaded music files, the music may have been encoded to prevent its recordal on other devices. Thus, while the user may download the music onto a desktop computer, copy-prevention mechanisms may prevent use of that file anywhere else, e.g. on a portable music appliance. Again, Capturing the audio provides the user a copy that can be transferred to another device. (The music file provided by the clearinghouse can have copy-prevention limits of its own—e.g., the file can be copied, but only once, or the file can be copied only onto devices owned by the user.)

(Confirmation of device ownership can be implemented in various ways. One is to identify to the clearinghouse all music devices owned by a user at the time the user registers with the clearinghouse (supplemented as necessary by later equipment acquisitions). Device IDs associated with a user can be stored in a database at the clearinghouse, and these can be encoded into the downloaded music as permitted devices to which the file can be copied, or on which it can be played.)

The commerce opportunity presented by non-commercial music web-sites is but one enabled by digital watermarks. There are many others.

To take one example, consider the media by which music and artists are presently promoted. In addition to radio airtime, these include music videos (a la MTV), fan magazines, web advertisements, graphical icons (e.g. the Grateful Dead dancing bears), posters, live events, movies, etc. Watermarked data can be used in all such media as a link in a commercial transaction.

A poster, for example, typically includes a photo of the artist, and may comprise cover-art from a CD. The photo/art can be digitally watermarked with various types of data, e.g., the artist's identify, the record label that distributes the artist's work, the music project being particularly promoted by the poster (e.g. a CD, or a concert tour), a fan web-site related to the artist, a web-site hosted by the record label for selling audio in CD or electronic form, a web-site from which free music by the artist can be downloaded, data identifying the poster itself, etc.

A user, equipped with a portable appliance that merges the functions of palmtop computer and digital camera, can snap an image of the poster. The processor can decode the watermarked data, and initiate any of various links based on the decoded data.

In an exemplary embodiment, after snapping the picture, the user invokes a software program on the device that exposes the various links gleaned from the snapped image data. Such a program can, for example, present the option of linking to the artist's fan web site, or downloading free streaming audio or music clips, or ordering the promoted CD, or requesting the above-noted clearinghouse to download a personal copy of selected song(s) by the artist to the user's personal music library, etc. (The device is presumed to have a wireless internet link. In devices not having this capability, the requested actions can be queued and automatically executed when a link to the internet is available.)

Still more complex transactions can be realized with the use of a remote database indexed by digital watermark fields decoded from the poster. For example, the poster may promote a concert tour. Fields of the digital watermark may identify the artist (by a code or full text), and a web site or IP address. The user appliance establishes a link to the specified site, and provides the artist identifier. In response, the site downloads the tour schedule for that artist, for display on the device. Additionally, the downloaded/displayed information can include a telephone number that can be used to order tickets or, more directly, can indicate the class of seats still available at each (or a selected) venue, and solicit a ticket order from the user over the device. The user can supply requested information (e.g. mailing address and charge card number) over the return channel link (wireless or wired, as the case may be), and the ticket(s) will be dispatched to the user. In the case of a wireless link, all of this can occur while the user is standing in front of the movie poster.

Similar systems can be implemented based on watermark data encoded in any other promotional media. Consider music videos. Using known TV/computer appliances, watermark data added to such videos can readily be decoded, and used to establish links to audio download, CD-sales, fan club, concert ticket outlet web sites, etc., as above.

Even live events offer such watermark-based opportunities. The analog audio fed to public address or concert speakers can be watermarked (typically before amplification) to encode plural-bit digital data therein. A next generation personal music appliance (e.g. one with a wireless interface to the internet) can include analog record capability (e.g. a built-in microphone, analog-to-digital converter, MP3 encoder, coupled to the unit's semiconductor memory). A user who attends a live event may record an excerpt of the music. The watermark can then be decoded, and the extracted data used to access the links and commerce opportunities reviewed above.

Cinema movies offer both audio and visual opportunities for watermark-based commerce opportunities. Either medium can be encoded to convey information of the types reviewed above. A personal appliance with image- or audio-capture capabilities can capture an excerpt of the audio or imagery, decode the watermark data therefrom, and perform any of the linking, etc., functions reviewed above.

The consumer-interest watermarks reviewed above are only exemplary. Many others will be recognized as useful. For example, promotional clips presented before a feature film presentation can include watermark data that point (either by a literally encoded web address link, or by an ID code that indexes a literal link in a remote link database) to reviewer critiques of the previewed movies. Watermark data in a featured film presentation can lead to web sites with information about the movie stars, the director, the producer, and can list other movies by each of these persons. Other watermark-conveyed web links can present opportunities to buy the movie on videotape, to purchase the movie soundtrack, to buy movie-related toys and games, etc.

More on Device Control

Much of the foregoing has focused on watermark encoding to provide enhanced customer experiences or opportunities. Naturally, watermarks data can alternatively, or additionally, serve the interests of the media owner.

To illustrate, consider watermarked music. The media owner would be best served if the watermark serves dual purposes: permissive and restrictive. Permissively, music appliances can be designed to play (or record) only music that includes an embedded watermark signaling that such activity is authorized. By this arrangement, if music is obtained from an unauthorized source and does not include the necessary watermark, the appliance will recognize that it does not have permission to use the music, so will refuse requests to play (or record).

As noted, music appliances can respond restrictively to the embedded watermark data to set limits on use of the music. Fields in the watermark can specify any or all of (or others in addition to) (a) the types of devices on which the music can be played (b) the types of devices on which the music can be recorded; (c) the number of times the music can be played; (d) the number of times the music can be recorded, etc.

The device restrictions (a) and (b) can be of various types. In some embodiments, the restrictions can identify particular units (e.g. by serial number, registered owner, etc.) that are authorized to play/record the encoded music. Or the restrictions can identify particular classes of units (e.g., battery-powered portable players with music memories of less than 50 megabytes, disk-based dedicated music appliances, general purpose personal computers, etc.) Or the restrictions can identify particular performance quality criteria (e.g., two channel, 16-bit audio at 44.1 KHz sample rate, or lower quality).

The use restrictions (c) and (d) can likewise be of various types. Examples include "do not copy," "copy once only," "unrestricted copying permitted," "play once," "play N times" (where N is a parameter specified elsewhere in the watermarked data, or by reference to a database indexed by a watermark data field), "unrestricted playing permitted," etc.

It is straightforward to design a music appliance to respond to usage limits of zero (e.g. "do not copy") and infinity (e.g. "unrestricted copying permitted," and "unrestricted playing permitted"). The device simply examines one or more bits in the watermark data, and permits (or refuses) an operation based on the value thereof.

Implementation of the other usage-control restrictions can proceed in various ways. Generally speaking, the stored music can be altered to give effect to the usage-control restrictions. For example, if the music is "record-once," then at the time of recording, the appliance can alter the music in a fashion indicating that it now has "do not record" status. This alteration can be done, e.g., by changing the watermark data embedded in the stored music (or adding watermark data), by changing other data stored in association with the music, etc. If the original signal is stored (as opposed, e.g., to a streaming signal, such as an internet or wireless transmission), it too should be so-altered.

Likewise with playback limitations. The number of playbacks remaining can, e.g., be encoded in an updated watermark in the music, be tracked in a separate counter, etc.

More particularly considering the "copy once" usage restriction, an illustrative embodiment provides two distinct watermark payload bits: a "copy once" bit and a "copy never" bit. When originally distributed (whether by internet, wireless, or otherwise), the "copy once" bit is set, and the "copy never" bit is un-set.

When music encoded in this fashion is provided to a compliant recording device, the device is authorized to make one copy. (A compliant device is one that recognizes encoded watermark data, and behaves as dictated by the watermark.) When this privilege is exercised, the recording device must alter the data to ensure that no further copying is possible. In the illustrated embodiment, this alteration is effected by the recording device adding a second watermark to both the music, with the "copy never" bit asserted. The second watermark must generally be encoded in an "orthogonal" domain, so that it will be detectable notwithstanding the continued presence of the original watermark. Compliant equipment must then check for both watermarks, and refuse to copy if either is found to have the "copy never" bit asserted.

One advantage to this arrangement is that if the watermark signal has undergone some form of corruption (e.g. scaling or resampling), the first watermark may have been weakened. In contrast, the second watermark will be native to the corrupted signal, and thus be more easily detected. (The corruption may also contribute to the orthogonality of one watermark relative to the other, since the two watermarks may not have precisely the same time base or other foundation.)

An alternative approach is not to encode the "copy never" bit in the original music, but leave this bit (in whatever manifestation) blank (i.e. neither "1" nor "0"). In transform-based watermark techniques, this can mean leaving transform coefficient(s) corresponding to the "copy never" bit un-changed. If the watermarking is effected in the temporal sample domain (or spatial domain, for image data), this can mean leaving certain samples (pixels) unmodified. The recording device can then alter the transform coefficients and/or samples as necessary to assert the previously-unencoded "copy never" bit when the permitted recording is made.

In such a system, compliant recording devices check for the "copy never" bit in the sole watermark, and refuse to make a copy if it is asserted (ignoring the value of any "copy once" bit).

A third approach to "copy once" is to set both the "copy once" and "copy never" bits, but set the former bit very weakly (e.g. using lower gain and/or high frequency DCT coefficients that do not survive certain processing). The frail "copy once" bit is designed not to survive common corruptions, e.g., resampling, scaling, digital to analog conversion, etc. To further assure that the "copy once" bit is lost, the recording device can deliberately add a weak noise signal that masks this bit (e.g. by adding a noise signal in the frequency band whose DCT coefficient conveys the "copy once" bit). In contrast, the "never copy" bit is unchanged and reliably detectable.

In such a system, compliant devices check for the "copy once" bit in the sole watermark, and refuse to make a copy if it is not detected as set.

These three examples are but illustrations of many possible techniques for changing the rights associated with a work. Many other techniques are known. See, e.g., the proposals for watermark-based copy control systems for digital video at the Copy Protection Technical Working Group, http://www.dvcc.com/dhsg/, from which certain of the foregoing examples are drawn. See also Bloom et al, "Copy Protection for DVD Video," IEEE Proceedings, Special Issue on Identification and Protection of Multimedia Information, June, 1999.

Scaleability

One feature that is desirable in many detector embodiments is scaleability. This refers to the ability of a detector to scale its computational demands to match the computational resources available to it. If a detector is running on a high performance Pentium III workstation, it should be "doing more" than if the same detector is running on a slow microcontroller. One way scalability can be achieved is by processing more or less chunks of input data (e.g. temporal excerpts of music, or blocks/macroblocks of pixels in a frame of video data) to decode watermarks. For example, an input audio stream might be broken into chunks of one second each. A fast processor may complete decoding of each chunk in less than a second, permitting it successively to process each chunk in the data stream. In contrast, a slow processor may require two and a half seconds to decode the watermark from a chunk. While it is processing a first chunk, the second and third pass by un-decoded. The processor next grabs and processes the fourth chunk, permitting the fifth and sixth to pass by un-encoded.

The detector running on the fast processor is clearly more difficult to "fool," and yields a decoded watermark of higher confidence. But both systems decode the watermark, and both operate in "real time."

The skipping of input data in the temporal (e.g. music or video) or spatial (e.g. image or video) domain is but one example of how scaleability can be achieved. Many other approaches are known to those skilled in the art. Some of these alternatives rely on spending more or less time in the data analysis phases of watermark decoding, such as cross-correlation operations.

Reference has been made to watermarked UIDs as referring to a database from which larger data strings (e.g. web addresses, musician names, etc.) can be retrieved. In some embodiments, the data record referenced by a UID can, in turn, point to several other database records. By such arrangements, it is often possible to reduce the payload of the watermark, since a single UID reference can lead to several different data records.

Production Tools

In the prior art, the watermark embedded in a source material is typically consistent and static through a work—unchanging from beginning to end. But as will be recognized from the foregoing, there are many applications that are better served by changing the watermark data dynamically during the course of the work. According to another aspect of the invention, a production tool is provided that facilitates the selection and embedding of dynamically-changing watermark data. One such embodiment is a software program having a user interface that graphically displays the different watermark fields that are being embedded in a work, and presents a library of data (textually or by icons) that can be inserted into each field, and/or permits the user to type in data to be encoded. Another control on the UI controls the advance and rewind of the media, permitting the user to determine the location at which different watermark data begins and ends. Graphical paradigms known from video- and audio-editing tools can be used to indicate the starting and ending frames/samples for each different watermark payload.

Such a tool can be of the standalone variety, or can be integrated into the desktop audio- and video-production and editing tools offered by vendors such as Avid, Adobe, Jaleo, Pinnacle Systems, SoundForge, Sonic Foundry, Xing Technology, Prosoniq, and Sonic Desktop Software.

Payment-Based Systems

Another aspect of the present invention is the use of anonymous payment tokens that can be used to obtain content on the web. In one embodiment, a token comprises a 128-bit pseudo-random number, to which additional bits identifying an issuing bank (or other issuing institution) are appended. (The additional bits can be the IP address of a web server of the bank, a routing number identifying the bank for electronic wire transfers, or other identifier.) The 128-bit numbers are randomly generated by the bank—commonly as needed—and each represents a fixed increment of money, e.g. ten cents.

A consumer wishing to have a store of currency for such commerce pays the bank, e.g., $10 in exchange for 100 tokens. These tokens are transferred electronically to disk or other storage in the consumer's computer in response, e.g., to a credit card authorization, or may be provided by diskette or other storage medium over the counter at a bank branch (in which case the consumer thereafter copies the numbers into storage of his or her computer). (Outlets other than banks can of course be employed for distributing such numbers, much in the manner that convenience and many grocery stores commonly issue money orders.)

Imagine that the consumer wishes to view the final quarter of a Trailblazer basketball game that aired on television a week ago. (The consumer may have either missed the game, or may have seen it but wants to see the last quarter again.) The user directs a web browser to a web site maintained for such purpose and performs a search to identify the desired program. (Typically, the web site is maintained by the proprietor that holds the copyright in the material, but this need not be the case. Some material may be available at several web sites, e.g., maintained by ABC Sports, the National Basketball Association, and Sports Illustrated.) The search can use any of various known search engines, e.g., Infoseek, Verity, etc., and can permit searching by title terms, keywords, date of airing, copyright owner, etc. By typing in, e.g., the keyword 'Trailblazers' and the date '4/26/99,' the consumer is presented a listing of videos available for download. One, hopefully, is the requested game. With each listing is an indication of an associated nominal charge (e.g. 80 cents).

On clicking on a hypertext link associated with the desired basketball game, the viewer is presented a further screen with one or more options. The first of the listed options is the entire game, with commercials. The charge is the nominal charge presented on the earlier screen (i.e. 80 cents). Other options may include the first, second, third, and fourth quarters of the game individually, each of which—save the last, costs 20 cents. The last may be charged at a premium rate, e.g., 30 cents. Clicking on the desired video option yields a further screen through which payment is effected.

To pay for the requested video, the consumer instructs his or her computer to transfer three of the earlier-purchased tokens over the web to the video provider. Various user interface metaphors can be employed to facilitate this transfer, e.g., permitting the user to type the amount of money to be transferred in a dialog box presented on-screen, or dropping/dragging icons representing tokens from an on-screen "wallet" to an on-screen "ticket booth" (or over an icon or thumbnail representing the desired content), clicking on an "increment" counter displayed adjacent the listing of the content, etc. Once the consumer has authorized a transfer of sufficient tokens, the consumer's computer sends to the web site (or to such other web address as HTML encoding in the viewed web page may indicate) the tokens. This transmission simply takes the form of the three 128+ bit numbers (the '+' indicating the bank identifier)—in whatever packet or other format may be used by the internet link. Once dispatched in this manner, the tokens are deleted from the user's computer, or simply marked as spent. (Of course, in other embodiments, a record of the expenditure may be stored in the consumer's computer, e.g., with the token contents and a record of the audio or video purchase to which they were applied.)

Since the amount of money is nominal, no encryption is provided in this embodiment, although encryption can naturally be provided in other embodiments (e.g., either in sending the tokens from the user to the web site, or earlier, in sending the tokens to the user). As will be seen, provided that the media provider immediately sends the tokens to the bank in real time, encryption is a nice feature but not mandatory On receipt of the token data, the web site immediately routes the token data to the identified bank, together with an identifier of the media provider or account to which the funds represented thereby are to be credited. The bank checks whether the 128-bit numbers have been issued by that bank, and whether they have already been spent. If the numbers are valid, the bank updates its disk-based records to indicate that the three tokens have been spent and that the bank now owes the media supplier 30 cents, which it may either pay immediately (e.g., by crediting to an account identified by the media provider) or as one lump sum at the end of the month. The bank then sends a message to the web site confirming that the tokens were valid and credited to the requested account. (Optionally, a message can be sent to the purchaser of the tokens (if known), reporting that the tokens have been redeemed.)

In response, the web site begins delivery of the requested video to the consumer. In the illustrated embodiment, the video is watermarked prior to delivery, but otherwise sent in unencrypted fashion, typically in streaming format, but optionally in file format. (Encryption can be used in other embodiments.) The watermarking in the illustrated embodiment is accomplished on-the-fly and can include various data, including the date of downloading, the download site, the destination IP address, the identity of the purchaser (if known), etc.

The large size of the video and the small charge assessed therefor provide disincentives for the consumer making illicit copies. (Especially as to archival material whose value decays with time, there is not much after-market demand that could be served by illicit copies, making third party compilation of such material for re-distribution financially unattractive. First run video, and material that keeps a high value over time, would not be as well suited for such distribution, and could better employ technology disclosed elsewhere herein.)

In some embodiments, the integrity of the received video is checked on receipt. This feature is described below in the section entitled Watermark-Based Receipts.

In the illustrative system, nothing in the tokens indicates the identity of the purchaser. The web site knows the IP address of the site to which video was delivered, but need not otherwise know the identity of the purchaser. The bank would probably maintain a record of who purchased the tokens, but need not. In any event, such tokens could thereafter be exchanged among consumers, resulting in anonymity from the bank, if desired.

As described above, the video excerpts from which the consumer can select include commercials. At some sites, video may be provided from which the commercials have been excised, or which is delivered in a manner that skips past the commercials without transmitting same to the consumer. Such video will naturally command a premium price. In some embodiments, the difference in price is electronically credited as compensation to accounts maintained for (or by) the advertisers, whose advertisements are not being viewed by such consumers. (The identification of advertisers to be credited is desirably permanently encoded in the video, either throughout the video (if the video has had the commercials removed therefrom), or by data in the commercials themselves (which commercials are skipped for transmission to the consumer, but can still be decoded at the video head-end. Such encoding can be by in-band watermarking or otherwise.)

While the foregoing discussion particularly considered video as the desired content, the same principles are equally applicable in connection with audio, still imagery, and other content.

The token-based payment method is but one of many that can be employed; the literature relating to on-line payment mechanisms is extensive, and all such systems can generally be here-employed.

Tracking 128-bit tokens can be a logistical problem for the bank. One approach is to have a memory with $10^{128}$ locations, and at each location store a two-bit value (e.g. 00=never issued; 01=issued but not spent; 10=issued and spent; 11=reserved). More complete data could alternatively be stored, but such a memory would be impractically large.

One alternative approach is to hash each 128-bit number, when issued, to a much smaller key value (e.g. 20 bits). A memory with $10^{20}$ locations can be indexed by this key. Each such location can include four data: an issued 128-bit token number that hashes to that value, first and second date fields indicating the date/time on which that token was issued and redeemed, respectively, and a link specifying the address of a next memory location. That next memory location (outside of the original $10^{20}$ locations) can include four more data, this time for a second issued-128-bit token number that hashed to the original key value, two date fields, and again with a link to a subsequent storage location, etc.

When a 128-bit random number is generated, the original memory location indexed by the hash code of that number is checked for an earlier number of the identical value (to avoid issuance of duplicate tokens). Each successive location in the linked chain of memory locations is checked for the same 128-bit number. When the end of the linked chain is reached, the bank knows that the 128-bit random number has not previously been issued, and writes that number in the last-addressed location, together with the date of issuance, and a link to a next storage location.

When a 128-bit token is received, the same linked-list processing occurs to identify a first location, and to thereafter step through each subsequent location until a match is found between the token number and the number stored in one of the linked memory locations. When found, that number is marked as redeemed by writing a redemption date/time in the corresponding field. If the search reaches the end of the linked chain without finding a match between the stored numbers and the token number, the token is treated as invalid (i.e. not issued by that bank).

Other manners of tracking the large number of possible token numbers can of course be used; the foregoing is just exemplary. Or the tokens needn't be tracked at all. Such an arrangement is highly practical if the token has sufficient bits. With the illustrated 128 bits, for example, the chance of two identical tokens being issued is infinitesimally small, so checking for duplicate issuance can be omitted if desired. In such case, the bank can simply maintain an ordered list of the token numbers still outstanding and valid. As new tokens are dispensed, their token numbers are added to the list. As tokens are redeemed, their numbers are deleted from the list. Known list processing techniques can be employed to speed such search, update, and delete actions.

Watermark-Based Receipts

Pay-for-content applications commonly assume that if content is transmitted from a server (or head-end, etc.), it is necessarily received. Sometimes this assumption is wrong. Network outages and interruptions and internet traffic load can diminish (e.g., dropped video frames), or even negate (e.g., failed delivery), expected consumer enjoyment of content. In such cases, the consumer is left to haggle with the content provider in order to obtain an adjustment, or refund, of assessed charges.

Watermarks provide a mechanism for confirming receipt of content. If a watermark is detected continuously during a download or other delivery event, a software program (or hardware device) can issue an electronic receipt attesting that the content was properly delivered. This receipt can be stored, and/or sent to the content distributor to confirm delivery.

In one embodiment, a content receiving device (e.g., computer, television or set-top box, audio appliance, etc.) periodically decodes a watermark from the received content to confirm its continued reception. For example, every five seconds a watermark detector can decode the watermark and make a record of the decoded data (or simply record the fact of continued detection of the same watermark). When a changed watermark is detected (i.e., reception of a different content object begins), the duration of the previously-received content is logged, and a receipt is issued.

In a related embodiment, the last portion (e.g., 5 seconds, frame, etc.) of the content bears a different "end of content" watermark that triggers issuance of a receipt. Such a watermark can indicate the length of the content, to serve as a cross-check against the periodic watermark polling. (E.g., if periodic sampling at 2 second intervals yields 545 samples corresponding to the same content, and if the "end of content" watermark indicates that the content was 1090 seconds long, then receipt of the entire content can be confirmed.)

In another embodiment, the watermark can change during the course of the content by including, e.g., a datum that increments every frame or other increment of time (e.g., frame number, time stamp, etc.). A watermark detector can monitor the continued incrementing of this datum throughout the content to confirm that no part was garbled (which would destroy the watermark) or was otherwise missing. Again, at the end of delivery, the receiving system can issue a confirmation that XXX frames/seconds/etc. of the identified content were received.

One application of such technology is to bill for content based on receipt, rather than transmission. Moreover, billings can be adjusted based on percentage of content-value received. If delivery is interrupted mid-way through (e.g., by the consumer disabling the content-receiving device), the nominal billing for the content can be halved. Some prolonged content, e.g., televised/web-broadcast university classes, cannot be "consumed" in one session, and are thus particularly well suited for such pay-as-you-consume billing.

Another application of such technology is in advertising verification. Presently, ads are tracked by transmission or, less frequently, by detection of an embedded code on receipt (c.f., Nielsen Media Research's U.S. Pat. Nos. 5,850,249 and 5,737,025). However, such reception-detectors—once triggered—generally do not further note the length of time that the advertising was received, so the same data is produced regardless of whether only five or fifty seconds of a commercial is presented. Watermark monitoring as contemplated herein allows the duration of the advertising impression to be precisely tracked.

In one application of this technology, recipients of advertising are provided incentives for viewing advertising in its entirety. For example, a content-receiving device can include a watermark detector that issues a receipt for each advertisement that is heard/viewed in its entirety. These receipts can be redeemed, e.g., for content tokens as described elsewhere herein, for monetary value, etc. In some embodiments, receipts are generic and can all be applied to a desired premium, regardless of the advertisements through which they were earned. In other embodiments, the receipts are associated with the particular advertisers (or class of advertisers). Thus, a TV viewer who accumulates 50 receipts from advertising originating from Procter & Gamble may be able to redeem same for a coupon good for $2.50 off any Procter & Gamble product, or receipts from Delta Airlines may be redeemed for Delta frequency flier miles (e.g., at a rate of one mile per minute of advertising). Such incentives are particularly useful in new forms of media that give the consumer enhanced opportunities to fast-forward or otherwise skip advertising.

(Although the foregoing "receipt" concept has been described in conjunction with watermark data (and use of watermark technology is believed to be inherently advantageous in this application), the same principles can likewise be implemented with ancillary data conveyed by other means.)

Master Global Address

As suggested above, it is desirable that each piece of content have a web address (the "Master Global Address" (MGA), or "Master IP Address") associated with it. Such address is typically conveyed with the content, e.g., by an IP address watermarked therein.

Consider a consumer who downloads a streaming video having an English language soundtrack. The viewer may not speak English, or may otherwise prefer to listen to the soundtrack in another language. The user can decode the watermark data embedded in the video and initiate a link to the associated web address. There the user is presented with a list of soundtracks for that content object in other languages. The viewer can click on the desired language and receive same via a second simultaneous transmission (e.g., a second socket channel). The consumer's audio/video appliance can substitute the desired audio track for the default English track.

If the streaming video and the alternative soundtrack are hosted on the same server, synchronization is straightforward. The process governing transmission of the alternative soundtrack identifies the process that is streaming video to the same IP address. Based on SMPTE, or other time/frame data, the former process syncs to the latter. (If the two data streams don't originate through the same server, time/frame data can be relayed as necessary to the alternative soundtrack server to effect synchronization.)

Another application of the Master Global Address is to serve as a point to which monitoring stations can report the presence, or passage, of content. Consider, for example, a copyright-aware node through which content signals pass, e.g., a computer node on a network, a satellite transponder, etc. Whenever the node detects passage of a media object (e.g., by reference to a file extension, such as MP3, JPG, AVI, etc.), it sends a "ping" over the internet to the address encoded in the object, simply reporting passage of the object. Similar monitoring facilities can be provided in end user computers, e.g., reporting FileOpen, FileSave, Printing, or other use of content bearing MGA data.

This system can be expanded to include "ping" and "pong" phases of operation. When a software application (or a user appliance, such as a video or audio playback device) encounters a media object (e.g., at time of file open, at time of playback, etc.), it pings the MGA site to report the encounter. The MGA site "pongs" back, responding with instructions appropriate to the encounter. For example, if the object requires payment of a fee before full functionality or access is to be granted, the MGA site can respond to the application with instructions that the object be used (e.g., played back) only in some crippled state preventing the user's full enjoyment (e.g., impaired resolution, or impaired sound quality, or excerpts only, etc.). The MGA site can also inform the user application of the terms (e.g., payment) by which full functionality can be obtained. The application can graphically or audibly present such information to the user, who can authorize a payment, if desired, so that the content can be enjoyed in a less- (or un-) crippled state. On receipt of the payment authorization, the MGA site can inform the user application that enhanced access/usage rights have been purchased, and that the application may proceed accordingly.

Yet another application of the MGA is to present the user of a content object a menu of options that is customized to that object.

In current graphical operating systems, when a user clicks on an icon (e.g., with the right mouse button), a menu is presented detailing actions that can be undertaken in connection with the icon, or the file represented thereby. Such options are pre-programmed (i.e., static), and are typically determined by the operating system based solely on the file extension.

In accordance with this aspect of the present invention, clicking on an icon representing a media object initiates an internet link to the MGA site associated with the object. The MGA site responds with data that is used to customize the menu of options presented to the user in connection with that particular object.

Consider an icon representing a JPG image file. Right-clicking on the icon may yield a menu that gives the user various options presented by the operating system (e.g., delete, compress, rename), and additional options customized in accordance with data from the object's MGA site. These customized options may include, e.g., (a) open in 100×150 pixel format for free;
    (b) open in 480×640 pixel format for ten cents;
    (c) open in 960×1280 pixel format for twenty cents;
    (d) purchase rights to use this image in a newsletter having a circulation of under 1000 for $1.25;
    (e) display a complete listing of license options.

Clicking on options (b) or (c) initiates a commerce application through which funds are electronically transferred to the MGA site (by the above-described tokens or otherwise). In response, the MGA site responds (e.g., with TCP/IP or HTML instructions) authorizing an application on the user's computer to open the file in the requested manner. (The default application for JPG applications can then automatically be launched, or the computer may first query the user whether another application should be used instead.)

Clicking on option (d) proceeds as above, and permits full use of the image on the computer. Moreover, the MGA site sends a digital certificate to the user's computer memorializing the usage rights purchased by the consumer.

In this particular arrangement, no access control is placed on the content, e.g., by encryption, secure container technology, or the like. The nominal fees, and the ease of licensing, make it simple for the user to "do the right thing" and avoid copyright liability. In other embodiments, of course, known access control techniques can be used to limit use of the object until the requisite payment has been made.

Naturally, records of all such transactions are also logged at the MGA site.

Clicking on option (e) opens a browser window on the user's computer to a web site that presents a complete listing of license options available for that image. (The address of this web site is included in customization data relayed to the user device from the MGA site, but not explicitly shown to the user on the menu.) Through such web site, the user can select desired rights, effect payment, and receive the necessary authorization for software applications on the user's computer (or other media appliance) to open and/or process the content.

The object on which the user "clicks" needn't be an icon. It can be an image or other graphical representation. (And a "click" isn't necessary; a voice command or other signal may be used to the same effect with an audio clip or selection.)

Consider the popular merchandising of books and CDs over the internet. A JPG or other image file depicting the cover of a book, or the artwork of a CD cover, can be treated as a media object, and can include a watermarked MGA pointer. Right-clicking on such an image of a book cover could, through the MGA site, present to the user a menu of options that includes—in addition to those normally presented in conjunction with a JPG file—the following:

(a) "See the review of this book published in the New York Times on Apr. 19, 1999"
(b) "See the list of reviews of this book at Amazon.com"
(c) "Enter your own review of this book, for posting on Amazon.com"
(d) "See today's sales rank of this book at Amazon.com"
(e) "Purchase this book from Amazon.com for $16.95"
(f) "Purchase this book from Barnesandnoble.com for $19.95 and receive a $5.00 credit towards your next purchase"
(g) "Link to the web site that tells about the release of this title as a motion picture (presently scheduled to open on Oct. 10, 1999)"
(h) "Link to the Yahoo listing of web sites relating to this book"
(i) "Search Lycos for listings relating to this book."

If the user selects one of the purchase options from the menu, a pre-stored e-commerce profile—containing the user name, credit card number, billing address, ship-to address, etc., possibly in the form of an encrypted object—could be sent to the MGA site (or to the bookseller) to effect the purchase, or such selection could initiate display of additional screens or sub-menus through which the user would manually enter or select such information for transmission.

Others of the selections cause a new browser window to open on the user's computer, opening to a URL specified in data relayed from the MGA site but not displayed to the user in the menu. Appropriate HTML instructions can be generated to effect a particular query or other operation at the specified URL.

In some embodiments, the customized menu presents only a single choice in addition to those normally provided by the operating system, e.g., "Link to home." Clicking on this option opens a browser window to a home page at the MGA for that object. On that page, the user is presented with all of the foregoing options, and more (possibly including advertising graphics or multi-media). Such objects can serve as powerful marketing agents. Returning to the example discussed above, a JPG image file of a book cover may have, as its MGA, a web page hosted by a particular bookseller, providing purchase options and other information for that book. Marketing of books (or CDs, or cars, or consumer appliances, or virtually anything else) can be effected by disseminating such vendor-issued JPGs as widely as possible. Some book cover JPGs may be distributed by Amazon.com, others by Barnes&Noble.com, others by Borders.com—each pointing back to a different MGA through which purchase transactions for that book may be performed.

Returning to the MGA-customized menus, these needn't be limited to menus resulting from clicking on an icon or image (or signaling during an audio excerpt). Drop-down menus in application programs can likewise be populated with customized options, in accordance with customization data obtained from the MGA site for the object presently being accessed or used. Most graphical operating systems and application programs have well developed toolsets permitting such menu customization. Again, other data relayed from the MGA site is not shown to the user, but is employed by the computer (e.g., a browser program) to carry out menu options selected by the user.

Again the foregoing techniques are equally applicable for still images, audio, video, and other forms of content, and can readily be adapted for use both with general purpose computers, software applications, and specialized media appliances.

While, for expository convenience, the foregoing discussion contemplated embedding a literal URL address in the object as the MGA, more typically this is not the case. Instead, the MGA more commonly comprises identification data for the object (e.g. a 128-bit random ID), together with the URL for a name server computer that serves many (perhaps millions) of such objects (an example of the latter is the Digimarc MarcCentre server).

To obtain the desired data as detailed above, the user's computer (sometimes termed a client computer) links to the name server computer and provides the ID of the object being processed. The name server computer uses this ID to query a database, and obtains from the database the current IP address to which such queries should be routed. The name server computer can relay the request from the client computer to the correct destination address, or can return the correct destination address to the client computer, which can initiate such a link itself. By such arrangement, the IP address ultimately associated with an object can be easily changed as needed, simply by changing the corresponding record in the name server database, without rendering obsolete legacy objects having out-of-date addresses encoded therein.

In some embodiments, the URL of the name server needn't be included in the watermark. In the absence of a specified URL, the client computer may direct such links to a default name server address instead (stored locally or remotely). If that server doesn't recognize the object ID, it can return an error code, or pass the query on to other name servers. Those servers, in turn, can pass the query along to still other name servers if they don't recognize the object ID. In this fashion, an exponentially-large number of name servers might be quickly polled for information relating to the identified object. Alternatively, rather than encoding the complete IP address of the name server in an object watermark, the first N (e.g., 16) bits of the object ID might be used as a short-hand for one of 65,536 predetermined name server addresses, in accordance with data stored locally (e.g., on RAM or disk in the user's computer) or remotely (e.g., at a default name server IP address).

While the basic concept idea behind embedding MGA data within an object is to point to a repository of data about the object, a pointer the other way may be achieved as well.

As noted, the "ping" application of MGA data permits an MGA site to be informed of sites through which its object passes. More generally, the MGA site can log the originating address of each query it receives. Each such address can be presumed to have (or have had) a copy of the corresponding object. Media owners can thereby track the dissemination of copies of their media objects—at least insofar as use of such objects entails communicating with the associated MGA site.

Such tracking offers a great number of opportunities, some in the area of commerce. The MGA site corresponding to the cover art of a Garth Brooks CD, for example, can provide a listing of IP addresses of persons interested in that CD. Email or promotional data objects (e.g., audio clips) can be sent to that list of addresses when a subsequent Garth Brooks CD is released.

Such tracking also opens up a new dimension of internet searching. Presently, internet search engines use a brute force approach, visiting millions of pages across the web in order to identify, for example, a dozen instances of a given photograph file. MGAs offer a shortcut to such brute force approaches. With the present technology, a search engine can find a single instance of a photograph file and, by detection of the MGA data watermarked therein, link to the corresponding MGA site. From the MGA site, the search engine can obtain a listing (if such queries are authorized) of some or all of the other sites known by the MGA site to have copies of that photograph file. (Providing such data to search engines is a commerce opportunity for such MGA sites, which may permit such access to its listing of sites only in exchange for a fee. Or the MGA site may arrange to collect a tribute payment from the search engine proprietor each time the engine responds to a user query using data collected from the MGA site.)

Many of the addresses logged by the MGA may not be publicly-accessible data stores. The search engine can check each listed address to ensure that the desired object is present and accessible before adding the address to its database.

Covert Tracing

Co-pending application Ser. No. 09/185,380 describes anti-counterfeiting technology that looks for the presence of digital data corresponding to bank note imagery in a computer system, and makes a covert record of any attempt to process such data (e.g., Scan, FileOpen, FileSave, Print, Edit, etc.). Such records are hidden from the user of the system (using, e.g., various data encryption and obscuring techniques), but authorized law enforcement officials are provided tools by which these records can be recovered. The forensic data thereby obtained may prove useful in prosecuting counterfeiters. (Knowledge that a computer may be covertly storing evidence of attempted counterfeiting actions may prove as, or more, valuable in deterring counterfeiting than the covert records themselves.)

The same techniques can be employed to deter unauthorized processing of audio, image, video, or content by media pirates. In one embodiment, a computer's operating system (including peripheral device drivers) monitors various data within the system (e.g., data sent to writeable storage media, or sent via a serial port or network connection, etc.) for data bearing a do-not-copy watermark. The presence of such data being sent, e.g., to a writeable disk or to a remote computer, indicates that the do-not-copy instruction has been circumvented. In such case, the operating system writes one or more covert records memorializing the activity, for possible use in criminal prosecution if the computer is lawfully seized.

The example just-provided is but one of many monitoring and response techniques that may be employed to deter circumvention of copy-protection or other access control systems. Generally speaking, if content data is found where it shouldn't be, or is found used as it shouldn't be used, a corresponding record should be made. (Other intervention actions can be triggered as well; covert tracing is desirably just one of several parallel responses to suspected hacking.)

Meta-Data Accessed Using Watermarks

Meta-data, in formats known as XML, SGML, and HTML, is widely used to communicate information about digital objects (e.g., author, keywords, price, rights, caption, etc.). More generally, meta-data can be thought of as any data construct which associates the name of a property (e.g., "author), with the value of the property (e.g., "Mark Twain"). Such data commonly appears in a tag format, such as the following:

<META NAME="author" CONTENT="Mark Twain">

Meta-data is commonly exchanged between server and client computers in conjunction with the digital objects to which they relate (e.g., the text of a Mark Twain book).

As detailed herein, an important application of watermarking is likewise to convey information about media—in this case embedded within the media content itself (e.g., providing unique identification, establishing some basic behaviors such as do not copy, and providing links to extended functionality).

For meta-data to be useful, it must be linked to associated content, whether in the context of a browser, application program, operating system, asset management system, search engine, etc. However, as detailed below, the content and the associated meta-tags needn't always be conveyed together.

Consider an application program or other client process that receives a watermarked media object. The watermark includes an MGA for that object (which, as noted above, may not specify an ultimate IP address). Stored at the MGA site is meta-data corresponding to the object. By linking to the MGA site identified by the object's watermark, the client computer can obtain the meta-data corresponding to the object. This data can be stored at the client computer and used just as any other meta-data, e.g., to define the local functions that should be available for use with that object (e.g., buy, search, etc.)

A particular example is an on-line catalog of stock photography. Each photograph is watermarked with MGA data. To identify the photographer, copyright date, price, telephone number, subject, etc., an application program can link to the MGA site for that photograph, and obtain the corresponding meta-data. This data can then be displayed or used as needed. Data objects of disparate formats thus can readily be handled within a single, simple application program, since the program needn't concern itself with the varying formats for the associated meta-data (assuming the name servers provide this data in standardized format). Substantial flexibility in programming and object formatting is thereby achieved.

Returning to the internet search engine example described above, MGAs may become recognized as repositories rich in meta-data for media objects. Specialized search engines may focus their data collection around such sites, and be able to quickly identify the MGA sites corresponding to various Boolean combinations of meta-tag parameters.

Asset Management/Containers

Much has been written on the topic of asset rights management. Sample patent documents include U.S. Pat. Nos. 5,892, 900, 5,715,403, 5,638,443, 5,634,012, 5,629,980 and laid-open European application EP 862,318. Much of the technical work is memorialized in journal articles, which can be identified by searching for relevant company names and trademarks such as IBM's Cryptolope system, Portland Software's ZipLock system, the Rights Exchange service by Softbank Net Solutions, and the DigiBox system from InterTrust Technologies.

An exemplary asset management system makes content available (e.g. from a web server, or on a new computer's hard disk) in encrypted form. Associated with the encrypted content is data identifying the content (e.g. a preview) and data specifying various rights associated with the content. If a user wants to make fuller use of the content, the user provides a charge authorization (e.g. a credit card) to the distributor, who then provides a decryption key, allowing access to the content. (Such systems are often realized using object-based technology. In such systems, the content is commonly said to be distributed in a "secure container.")

Desirably, the content should be marked (personalized/ serialized) so that any illicit use of the content (after decryption) can be tracked. This marking can be performed with watermarking, which assures that the mark travels with the content wherever—and in whatever form—it may go. The watermarking can be effected by the distributor—prior to dissemination of the encrypted object—such as by encoding a UID that is associated in a database with that particular container. When access rights are granted to that container, the database record can be updated to reflect the purchaser, the purchase date, the rights granted, etc. An alternative is to include a watermark encoder in the software tool used to access (e.g. decrypt) the content. Such an encoder can embed watermark data in the content as it is released from the secure container, before it is provided to the user. The embedded data can include a UID. This UID can be assigned by the distributor prior to disseminating the container. Alternatively, the UID can be a data string not known or created until access rights have been granted. In addition to the UID, the watermark can include other data not known to the distributor, e.g. information specific to the time(s) and manner(s) of accessing the content.

As noted earlier, access rights systems can be realized with watermarks without containers etc. For example, in a trusting world, copyrighted works can be freely available on the web. If a user wishes to make lawful use of the work, the user can decode its watermark to determine the work's terms and conditions of use. This may entail linking to a web site specified by the embedded watermark (directly, or through an intermediate database), which specifies the desired information. The user can then arrange the necessary payment, and use the item knowing that the necessary rights have been secured.

Remote Reconfiguration of Watermark Detectors

In some cases, it is desirable to reconfigure watermark detectors remotely. Such functionality is desirable, for example, if a watermark system is hacked or otherwise compromised.

In accordance with this aspect of the present invention, some aspect of a watermark detector's operation is changed in response to a command. The change can take various forms. In watermark systems employing pseudo-random key data (e.g., spread spectrum spreading signals), the pseudo-random signal used for detection can be changed. In systems using DFT processing, the mapping between message bits and DFT coefficients can be changed. In still other systems, the decoding can proceed as before, but the significance of one or more bits can be changed (e.g., bits that were normally interpreted as defining Field A can be interpreted as defining Field B, and vice versa). In yet other systems, the decoding can proceed as before, but the response of a device to a given watermark signal can be changed. In still other systems, a set of software instructions can be re-written or re-ordered to effect a change in detector operation.

The command can be conveyed in various ways. In one embodiment, it can be a trigger bit in the watermark payload. Normally the bit has a value of "0." If the bit has a value of "1," the detector system responds by changing its operation. A trigger pattern can also be established, so that detection of a certain combination of bits in the watermark payload serves to trigger the change. Reserved states of certain data fields are examples of patterns that might be employed.

The command can also be conveyed through another channel different than the watermark channel (e.g., an SCA channel of an FM broadcast, or the sub-titling data channel of video broadcasts, or header data within an MPEG data stream, etc., etc.).

The change can proceed in accordance with a pre-programmed rule (e.g., codes progressing successively through a numerically or algorithmically-determined progression), or the change can proceed in accordance with data specified elsewhere in the payload of the watermark bearing the trigger bit (e.g., instead of being interpreted in normal fashion, the non-trigger bits of the detected watermark can define a new pseudo-random key data. Or the change can proceed in accordance with data conveyed in successively-presented watermark payloads, as might be done in video encoding where each frame of video can convey further watermark information. (This latter arrangement is one offering a high-bandwidth re-programming channel through which, e.g., extensive firmware instructions might be transferred to the detector to replace instructions earlier stored.)

By such arrangements, greatly increased detector versatility and functionality can be achieved.

Concluding Remarks

Many diverse embodiments are reviewed above—each with a unique set of features. (Still others are disclosed in the assignee's patents incorporated by reference.) To provide a comprehensive disclosure without unduly lengthening the specification, applicants incorporate by reference the patents and patent applications referenced above.

This specification should be construed as explicitly teaching that features illustrated in one such embodiment can generally be used in other embodiments as well. Thus, for example, a date field was not particularly discussed in connection with payload data for video watermarking. Nor were "play once" watermarks so-considered. The inclusion of a calibration signal with (or as part of) the watermark is shown in embodiments of the issued patents, but is not belabored in the above-described embodiments. Likewise with "simple universal codes." The pre-stored commerce profile described in one of the foregoing embodiments is equally applicable to other embodiments as well. Likewise, the presentation of advertising was discussed in connection with one embodiment but not others, although it, too, is generally applicable. All of these concepts are familiar at Digimarc and are regarded as generally applicable throughout the work expressed in Digimarc's patent disclosures. Practicality prevents an exhaustive recitation of each individual permutation and combination.

Having described and illustrated the principles of our invention with reference to illustrative embodiments, it will be apparent that the detailed arrangements can be modified in arrangement and detail without departing from such principles.

For example, while reference has been made to various uses of wireless, it should be understood that such reference does not just cover FM broadcast, and wireless internet networking and the like, but also includes other wireless mechanisms. Examples include cell phones and direct satellite broadcast.

Likewise, while certain embodiments were illustrated with a watermark payload of 100+ bits, in other systems much smaller (or sometimes larger) payloads are desirable—sometimes as small as 1-8 bits.

While the foregoing examples have each been illustrated with reference to a particular media type (e.g., video, audio, etc.), it will be recognized that the principles of each embodiment find application with the other media types as well.

Certain of the appliances contemplated above require user interfaces more sophisticated than are presently typical on such devices. The simplicity of the underlying audio appliance can be preserved, in many instances, by using a palmtop computer—coupled by infrared or otherwise—as a temporary user interface to the appliance. Some of the processing capability can likewise be off-loaded to an ancillary palmtop. (Palmtop is here meant to refer generally to any pocket-size programmable computing device.)

Unless otherwise stated, it should be understood that the digital music, video, and imagery contemplated herein is not of any particular form or format. Audio, for example, can be of various forms, both streaming and non-streaming, and of various formats (e.g. MP3, MP4, MS Audio, Windows Media Technologies, RealAudio, *.WAV, MIDI, Csound, Dolby's Advanced Audio Codec (AAC), etc.

Having described and illustrated the principles of the invention with reference to illustrative embodiments, it should be recognized that the invention is not so limited.

For example, while digital watermarking typically does not leave any human-apparent evidence of alteration or data representation, certain of the foregoing applications do not require this. The markings used may be visible, and even conspicuous, without impairing essential functionality. Thus, bar codes, data glyphs, OCR markings, and other machine-readable indicia may be substituted, depending on the particular application requirements.

While the detailed embodiments were generally described with reference to desktop computers, it is recognized that such devices will increasingly be supplanted by other digital appliances, including general purpose personal digital assistants, multifunction cell phones, and specialized devices. Moreover, the power and utility of the above-detailed embodiments and devices can be further enhanced by employing various wireless communications technologies, including the evolving Bluetooth standard.

The implementation of the watermark encoding and decoding systems is straightforward to artisans in the field, and thus not belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

I claim:

1. A method of altering a music signal to steganographically insert plural bits of watermark data therein, the method comprising:

steganographically inserting, using a processor, at least a first group of the plural bits for benefit of an end-user of the music signal by imperceptibly altering audible attributes of the music signal;

inserting a second group of bits different than the first for benefit of an artist whose music is encoded by the music data;

inserting a third group of bits different than the first two for benefit of a distributor of the music data; and storing in a registry accessible to the end-user an association between information about the music data and at least a portion of the plural bits.

2. The method of claim 1, further comprising storing in the registry an association between the first group of bits and an internet address of a web site accessible by end-users of the music signal, wherein the registry provides the web site address in response to receiving at least the first group of bits.

3. The method of claim 1, wherein the second group of bits includes bits representing a unique identifier for the music signal, wherein the unique identifier permits machine identification of the signal and royalty credit to the artist.

4. The method of claim 1, wherein the third group of bits represents usage restrictions to which audio appliances are responsive, thereby driving distribution of additional copies of the music signal.

* * * * *

UNITED STATES PATENT AND TRADEMARK OFFICE
CERTIFICATE OF CORRECTION

| | | |
|---|---|---|
| PATENT NO. | : 8,094,949 B1 | Page 1 of 1 |
| APPLICATION NO. | : 09/574726 | |
| DATED | : January 10, 2012 | |
| INVENTOR(S) | : Rhoads | |

It is certified that error appears in the above-identified patent and that said Letters Patent is hereby corrected as shown below:

Page 5, item (56), under "Other Publications", in Column 1, Line 47, delete "Symp. On" and insert -- Symp. on --.

Page 5, item (56), under "Other Publications", in Column 1, Line 54, delete "Watermaking" and insert -- Watermarking --.

Page 5, item (56), under "Other Publications", in Column 2, Line 15, delete "Watermaking" and insert -- Watermarking --.

Page 5, item (56), under "Other Publications", in Column 2, Line 28, delete "Conf. Of" and insert -- Conf. of --.

Page 5, item (56), under "Other Publications", in Column 2, Line 42, delete "3d" and insert -- $3^{rd}$ --.

Page 5, item (56), under "Other Publications", in Column 2, Line 42, delete "Conf. On" and insert -- Conf. on --.

Page 5, item (56), under "Other Publications", in Column 2, Line 48, delete "Proc. Of" and insert -- Proc. of --.

Column 1, line 5, delete "to copending application" and insert -- to application --.

Column 1, line 26, delete "now U.S. Pat." and insert -- (now U.S. Pat. --.

Signed and Sealed this
Nineteenth Day of June, 2012

David J. Kappos
*Director of the United States Patent and Trademark Office*